(12) United States Patent
Livneh et al.

(10) Patent No.: US 12,523,657 B2
(45) Date of Patent: Jan. 13, 2026

(54) DNA REPAIR BLOOD TEST FOR PREDICTING RESPONSE OF LUNG CANCER PATIENTS TO IMMUNOTHERAPY

(71) Applicant: Yeda Research and Development Co. Ltd., Rehovot (IL)

(72) Inventors: Zvi Livneh, Rehovot (IL); Tamar Paz-Elizur, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 944 days.

(21) Appl. No.: 17/670,467

(22) Filed: Feb. 13, 2022

(65) Prior Publication Data
US 2022/0170939 A1 Jun. 2, 2022

Related U.S. Application Data

(63) Continuation of application No. PCT/IL2020/050876, filed on Aug. 11, 2020.

(51) Int. Cl.
| | | |
|---|---|---|
| *G01N 33/574* | (2006.01) | |
| *A61K 31/7088* | (2006.01) | |
| *A61K 39/00* | (2006.01) | |
| *A61K 39/39* | (2006.01) | |
| *G01N 33/68* | (2006.01) | |

(52) U.S. Cl.
CPC ... *G01N 33/57423* (2013.01); *A61K 31/7088* (2013.01); *A61K 39/0011* (2013.01); *G01N 33/6893* (2013.01)

(58) Field of Classification Search
None
See application file for complete search history.

(56) References Cited

U.S. PATENT DOCUMENTS

| | | | | |
|---|---|---|---|---|
| 8,043,807 | B2 * | 10/2011 | Livneh | A61P 35/00 |
| | | | | 536/23.1 |
| 2011/0294134 | A1 | 12/2011 | Livneh et al. | |
| 2012/0046186 | A1 | 2/2012 | Pelham et al. | |
| 2015/0226671 | A1 | 8/2015 | Huang et al. | |

FOREIGN PATENT DOCUMENTS

| | | |
|---|---|---|
| WO | WO 2013/035071 | 3/2013 |
| WO | WO 2014/190090 | 11/2014 |
| WO | WO 2015/049371 | 4/2015 |
| WO | WO 2019/133697 | 7/2019 |
| WO | WO 2021/028909 | 2/2021 |

OTHER PUBLICATIONS

Office Action Dated Jan. 8, 2025 From the Israel Patent Office Re. Application No. 290463. (4 Pages).
International Preliminary Report on Patentability Dated Feb. 24, 2022 From the International Bureau of WIPO Re. Application No. PCT/IL2020/050876. (9 Pages).
International Search Report and the Written Opinion Dated Oct. 26, 2020 From the International Searching Authority Re. Application No. PCT/IL2020/050876. (14 Pages).
Office Action and Search Report Dated May 12, 2020 From the Israel Patent Office Re. Application No. 268663. (11 Pages).
Alharbi et al. "Durable Response to Nivolumab in A Pediatric Patient With Refractory Glioblastoma and Constitutional Biallelic Mismatch Repair Deficiency", The Oncologist, 23(12): 1401-1406, Published Online Aug. 13, 2018.
Le et al. "Mismatch-Repair Deficiency Predicts Resp;onse of Solid Tumors to PD-1 Blockade", Science, 357(6349): 409-413, Jul. 28, 2017.
Leitner-Dagan et al. "N-Methylpurine DNA Glycosylase and OGG1 DNA Repair Activities: Opposite Associations With Lung Cancer Risk", Journal of the National Cancer Institute, 104(22): 1765-1769, Published Online Oct. 27, 2012.
Livneh et al. "Potential DNA Rep;air Biomarker for Response to Immunotherapy of Lung Cancer Patients", Journal of Thoracic Oncology, 14(10S): S447-S448, # P1.04-22, Oct. 2019.
Paz-Elizur et al. "Novel Molecular Targets for Risk Identification: DNA Repair Enzyme Activities", Cancer Biomarkers, XP008083972, 3(3): 129-133, Jan. 2007.
Qing et al. "Upregulation of PD-L1 and APE1 Is Associated With Tumorigenesis and Poor Prognosis of Gastric Cancer", Drug Design, Development, and Therapy, XP055740803, 5(9): 901-909, Feb. 16, 2015.
Sevilya et al. "Development of APE1 Enzymatic DNA Repair Assays: Low APE1 Activity Is Associated With Increase Lung Cancer Risk", Carcinogenesis, XP055254152, 36(9): 982-991, Advance Access PublicationJun. 4, 2015.
Communication Pursuant to Article 94(3) EPC Dated Apr. 25, 2024 From the European Patent Office Re. Application No. 20768413.5. (6 Pages).

* cited by examiner

*Primary Examiner* — Manjunath N Rao
*Assistant Examiner* — Jae W Lee

(57) ABSTRACT

A method of selecting a treatment for a subject having cancer is disclosed. The method comprises:
(a) determining a level of catalytic activity of at least one DNA repair enzyme in a biological sample of the subject; and
(b) selecting an immune checkpoint regulator as a treatment for a subject having a statistically significant different level of catalytic activity of the DNA repair enzyme as compared to the catalytic activity of the DNA repair enzyme in a biological sample of a healthy subject.

22 Claims, 11 Drawing Sheets
(11 of 11 Drawing Sheet(s) Filed in Color)
Specification includes a Sequence Listing.

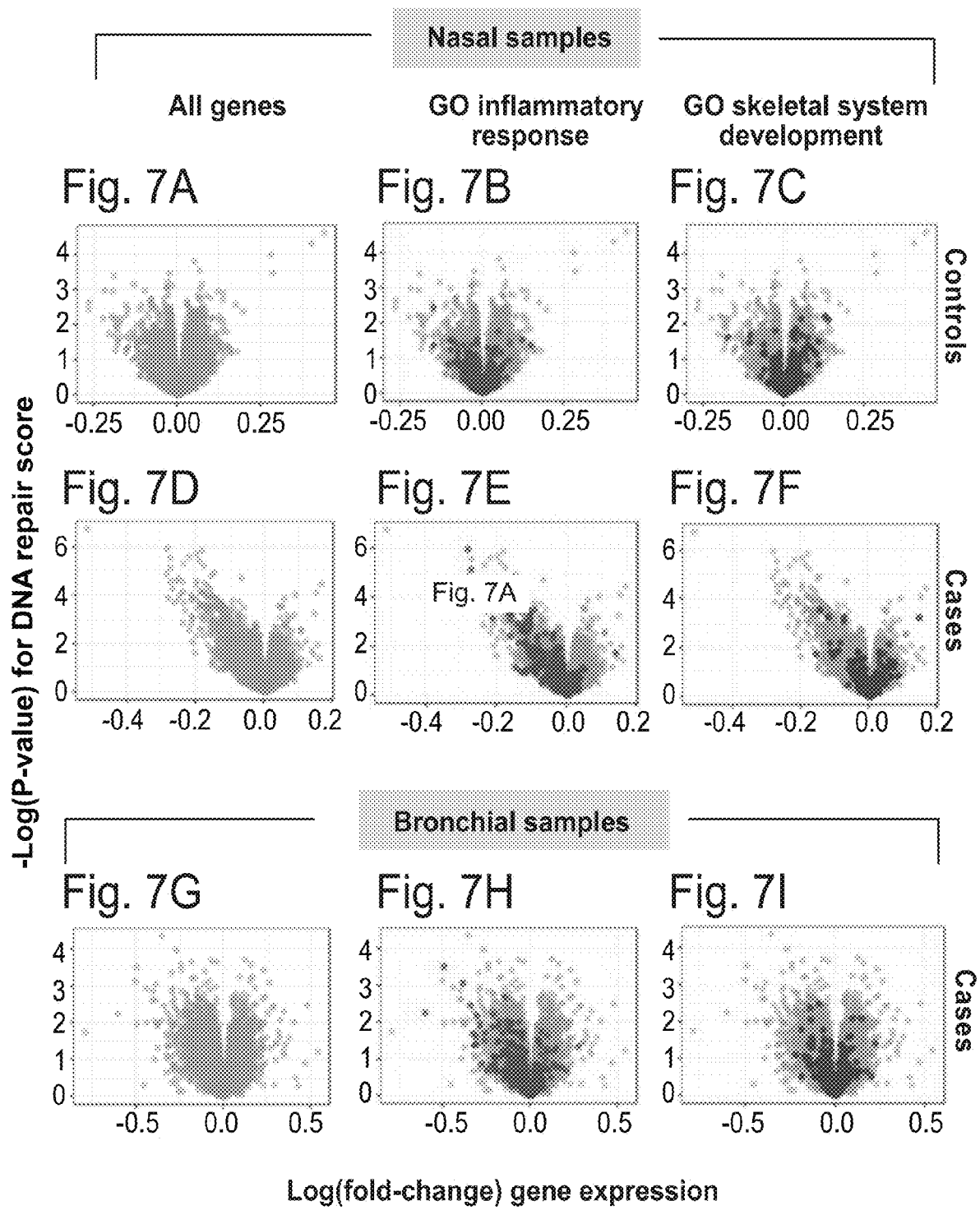

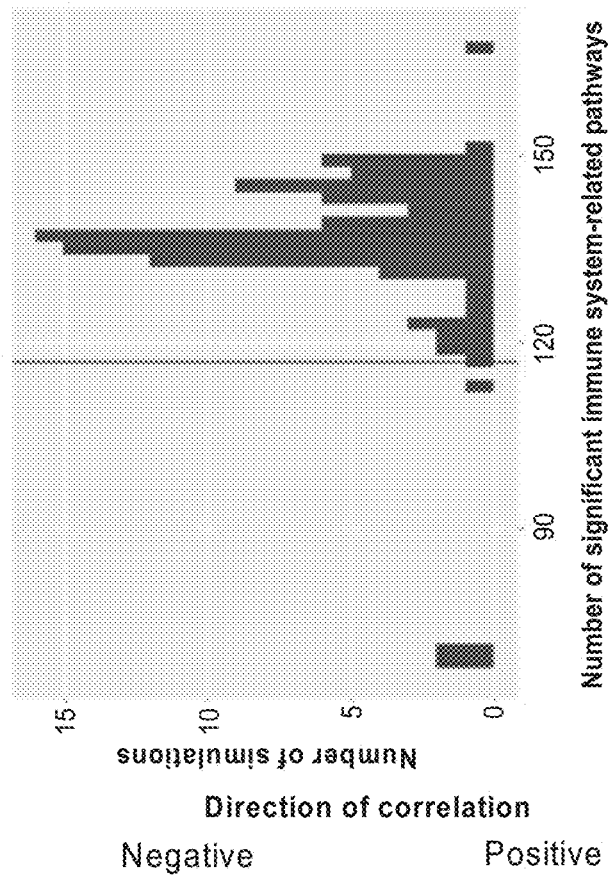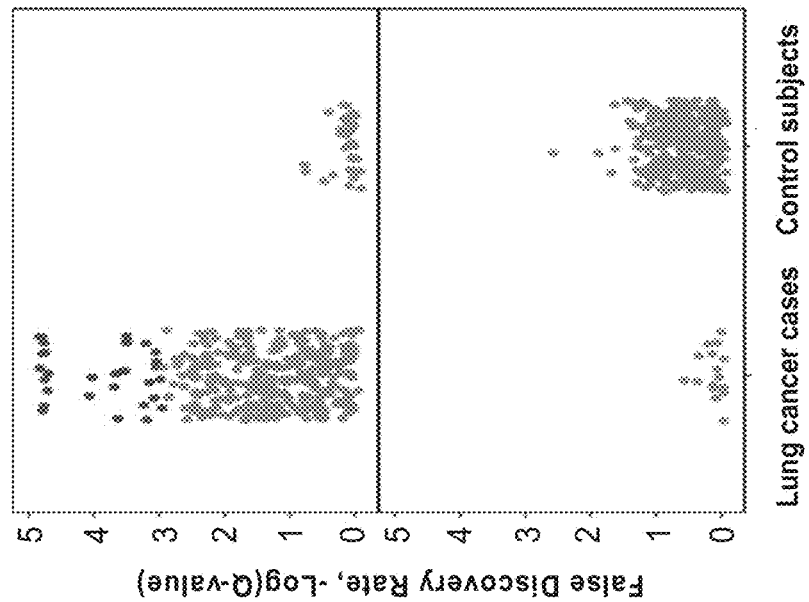

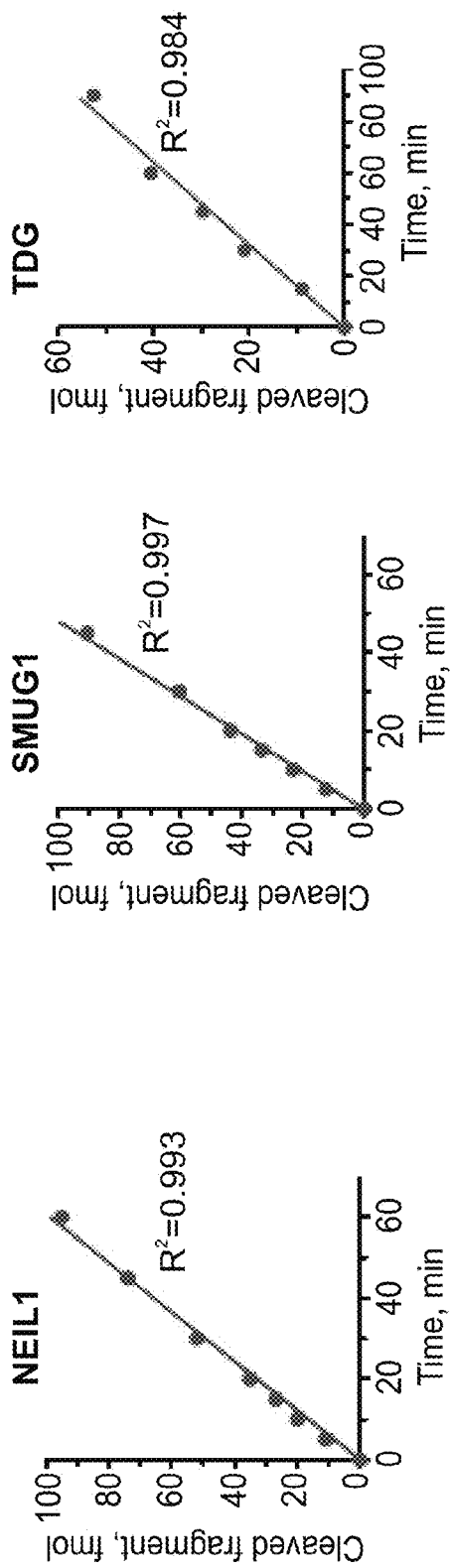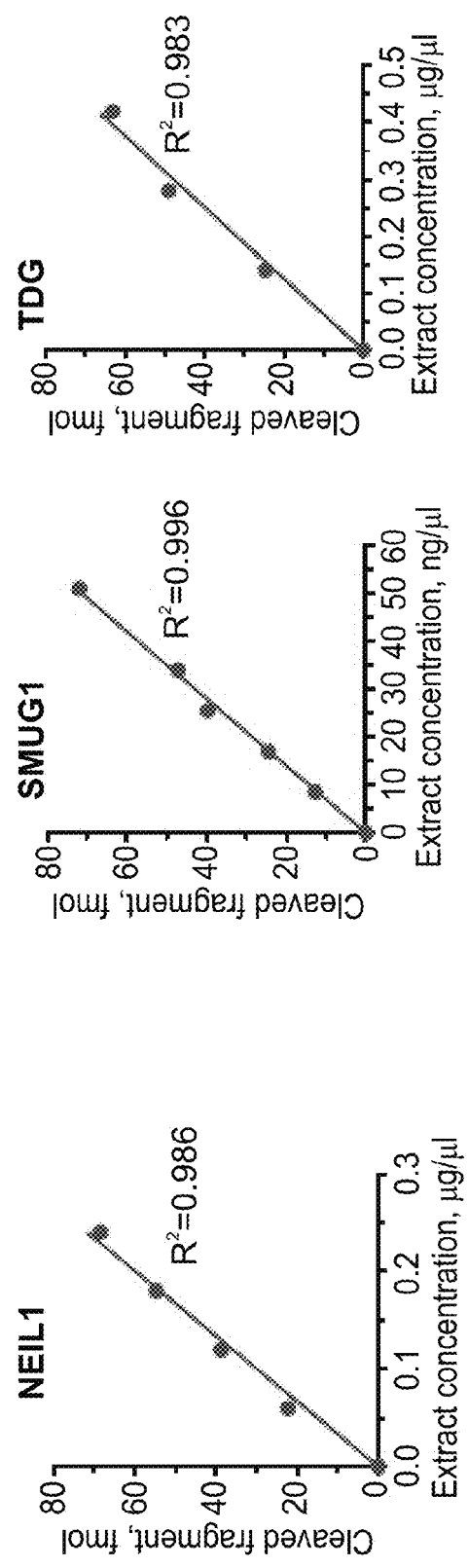
FIG. 11

DNA REPAIR BLOOD TEST FOR PREDICTING RESPONSE OF LUNG CANCER PATIENTS TO IMMUNOTHERAPY

RELATED APPLICATIONS

This application is a Continuation of PCT Patent Application No. PCT/IL2020/050876 having International filing date of Aug. 11, 2020, which claims the benefit of priority of Israeli Patent Application No. 268663 filed Aug. 12, 2019. The contents of the above applications are all incorporated by reference as if fully set forth herein in their entirety.

SEQUENCE LISTING STATEMENT

The ASCII file, entitled 90962SequenceListing.txt, created on Feb. 13, 2022, comprising 6,141 bytes, submitted concurrently with the filing of this application is incorporated herein by reference.

FIELD AND BACKGROUND OF THE INVENTION

The present invention, in some embodiments thereof, relates to a method of predicting response of lung cancer patients to immunotherapy and more specifically to immune checkpoint regulators.

Lung cancer is one of the most common cancer types, and killer number one being responsible for 156,000 deaths/year in the USA, 388,000 deaths/year in Europe, and 1.6 million worldwide[1]. 5-year survival rates are low, being <5% for stage 4 lung cancer. The recent progress in immunotherapy, and in particular the use of therapeutic antibodies directed to the cell surface protein PD-1 and its ligand PD-L1, dramatically affected lung cancer treatment, and became a standard-of-care for patients with advanced or metastatic non-small cell lung cancer (NSCLC) in first and later treatment lines. However, response is seen in only 10-20% of patients, raising the need for predictive biomarkers.

The biomarkers most commonly used, are the level of expression of PD-L1, and the tumor mutation burden (TMB). High PD-L1 expression on the surface of cancer cells enables them to escape disposal by the immune system, and indeed high expression of PD-L1 was found to increase the response to immunotherapy up to ≥50%. The rationale for testing TMB, is that the higher the mutational load, the higher the number of neoantigens on the cancer cells' surface, which suggests a better immune response. While essentially all cancers are characterized by an increased TMB, there are big differences between and within cancer types, with a higher TMB correlating with better response to immunotherapy[8]. Recent studies have shown that PD-L1 and TMB are independent predictive biomarkers for the immunotherapy response, probably because it reflects different ligand-receptor interactions involved in the T cell activation process. A subgroup of patients with high TMB exhibit microsatellite instability (MSI), indicating a deficiency in mismatch repair, causing also increased point mutations. A high MSI (MSI-H) was shown to be predictive of response to immunotherapy in several cancer types[11], leading in 2017 to the first FDA approval of a drug (pembrolizumab) based on a genetic marker, regardless of cancer type or tissue of origin.

WO2013/035071 discloses a panel of blood tests that measure the activity of three DNA repair enzymes, OGG1, MPG and APE1, which are part of the base excision repair pathway, and repair oxidative and alkylation DNA damage. Using these tests it was shown that a low DNA repair score composed of the three, is a strong risk factor for lung cancer, independent of, and in addition to smoking status.

Additional background art includes U.S. application No. 20110294134.

SUMMARY OF THE INVENTION

According to an aspect of the present invention there is provided a method of selecting a treatment for a subject having cancer, the method comprising:
(a) determining a level of catalytic activity of at least one DNA repair enzyme selected from the group consisting of N-methylpurine DNA glycosylase (MPG), apurinic/apyrimidinic endonuclease 1 (APE1), 8-oxoguanine DNA glycosylase 1 (OGG1), Nei Like DNA Glycosylase 1 (NEIL1), Single-Strand-Selective Monofunctional Uracil-DNA Glycosylase 1 (SMUG1) and Thymine DNA Glycosylase (TDG) in a biological sample of the subject; and
(b) selecting an immune checkpoint regulator as a treatment for a subject having a statistically significant different level of catalytic activity of the DNA repair enzyme as compared to the catalytic activity of the DNA repair enzyme in a biological sample of a healthy subject.

According to an aspect of the present invention there is provided a method of treating cancer of a subject comprising:
(a) selecting the subject according to the method of claim 1; and
(b) treating the cancer with an immune checkpoint regulator.

According to an aspect of the present invention there is provided an immune checkpoint inhibitor for treating cancer of a subject, when said subject has been selected for treatment as described herein.

According to an aspect of the present invention there is provided a method of treating a subject having cancer, the method comprising:
(a) determining a level of catalytic activity of at least one DNA repair enzyme selected from the group consisting of N-methylpurine DNA glycosylase (MPG), apurinic/apyrimidinic endonuclease 1 (APE1), 8-oxoguanine DNA glycosylase 1 (OGG1), Nei Like DNA Glycosylase 1 (NEIL1), Single-Strand-Selective Monofunctional Uracil-DNA Glycosylase 1 (SMUG1) and Thymine DNA Glycosylase (TDG) in a biological sample of the subject; and
(b) administering to a subject having a statistically significant different level of catalytic activity of the DNA repair enzyme as compared to the catalytic activity of the DNA repair enzyme in a biological sample of a healthy subject, a therapeutically effective amount of an immune checkpoint regulator; or administering to a subject having a non-statistically significant different level of catalytic activity of the DNA repair enzyme as compared to the catalytic activity of the DNA repair enzyme in a biological sample of a healthy subject, a therapeutically effective amount of an anti-cancer agent other than the immune checkpoint regulator, thereby treating the cancer.

According to an aspect of the present invention there is provided a method of treating cancer in a subject in need thereof comprising:
(a) receiving an identification that the subject has a statistically significant different level of catalytic activity of a DNA repair enzyme as compared to the catalytic activity of the DNA repair enzyme in a biological sample of a healthy subject, the DNA repair enzyme being selected from the group consisting of N-methylpurine DNA glycosylase (MPG), apurinic/apyrimidinic endonuclease 1 (APE1), 8-oxoguanine DNA glycosylase 1 (OGG1), Nei Like DNA Glycosylase 1 (NEIL1), Single-Strand-Selective Monofunctional Uracil-DNA Glycosylase 1 (SMUG1) and Thymine DNA Glycosylase (TDG); and (b) treating the subject with an immune checkpoint regulator.

According to embodiments of the present invention, the DNA repair enzyme comprises MPG, APE1 and OGG1.

According to embodiments of the present invention, the DNA repair enzyme comprises MPG, APE1, OGG1 and at least one DNA repair enzyme selected from the group consisting of NEIL1, SMUG1 and TDG.

According to embodiments of the present invention, the DNA repair enzyme comprises MPG, APE1 and OGG1 and wherein when a level of catalytic activity of the MPG is above a first predetermined value, when a level of catalytic activity of APE1 is below a second predetermined level and when a level of catalytic activity of OGG1 is below a third predetermined level the immune checkpoint regulator is selected as a treatment for the subject.

According to embodiments of the present invention, the DNA repair enzyme comprises MPG, APE1 and OGG1 and wherein when a level of catalytic activity of the MPG is above a first predetermined value, when a level of catalytic activity of APE1 is below a second predetermined level and when a level of catalytic activity of OGG1 is below a third predetermined level, the subject is administered with the checkpoint regulator.

According to embodiments of the present invention, the method further comprises determining an integrated DNA repair score for the subject from the level of the at least one DNA repair enzyme following step (a) and prior to step (b).

According to embodiments of the present invention, the method further comprises determining an integrated DNA repair score for the subject from the level of MPG, OGG1 and APE1 following step (a) and prior to step (b), wherein if the integrated DNA repair score is below a predetermined value, the immune checkpoint regulator is selected as a treatment.

According to embodiments of the present invention, the method further comprises determining an integrated DNA repair score for the subject from the level of MPG, OGG1 and APE1 following step (a) and prior to step (b), wherein the subject that is administered with an immune checkpoint regulator has an integrated DNA repair score below a predetermined level, and the subject that is administered with an anti-cancer agent other than the immune checkpoint regulator has an integrated DNA repair score above a predetermined level.

According to embodiments of the present invention, the identification comprises an integrated DNA repair score based on the level of MPG, OGG1 and APE1.

According to embodiments of the present invention, the cancer is selected from the group consisting of lung cancer, head and neck cancer, breast cancer, bladder cancer, glioblastoma, osteosarcoma, pancreatic cancer, ovarian cancer and cervical cancer.

According to embodiments of the present invention, the cancer is lung cancer.

According to embodiments of the present invention, the lung cancer is non-small cell lung cancer.

According to embodiments of the present invention, the biological sample is selected from the group consisting of a blood sample, a scraped cell sample and a biopsy.

According to embodiments of the present invention, the biological sample comprises blood cells.

According to embodiments of the present invention, the blood cells comprise isolated peripheral blood mononuclear cells.

According to embodiments of the present invention, the blood cells comprise T cells.

According to embodiments of the present invention, the T cells comprise ex vivo expanded T cells.

According to embodiments of the present invention, the determining the level of catalytic activity in the biological sample is effected using a protein extract of the biological sample.

According to embodiments of the present invention, at least one step of the determining the level of catalytic activity in the biological sample is effected by a robotic device.

According to embodiments of the present invention, the determining the MPG catalytic activity is effected using a double stranded oligonucleotide substrate having a hypoxanthine lesion (Hx).

According to embodiments of the present invention, the substrate comprises an oligonucleotide sequence as set forth in SEQ ID NO: 1 or SEQ ID NO: 7 annealed to an oligonucleotide sequence as set forth in SEQ ID NO: 2.

According to embodiments of the present invention, the determining the MPG catalytic activity is effected using an oligonucleotide substrate having an N6-ethenoadenine lesion (eA).

According to embodiments of the present invention, the substrate comprises an oligonucleotide sequence as set forth in SEQ ID NO: 3 annealed to an oligonucleotide sequence as set forth in SEQ ID NO: 4.

According to embodiments of the present invention, the determining the APE1 catalytic activity is effected using an oligonucleotide substrate having a furanyl abasic site lesion (AP).

According to embodiments of the present invention, the substrate comprises an oligonucleotide sequence as set forth in SEQ ID NO: 8 or SEQ ID NO: 10 annealed to an oligonucleotide sequence as set forth in SEQ ID NO: 9.

According to embodiments of the present invention, the determining the OGG1 catalytic activity is effected using an oligonucleotide substrate having an 8-oxoguanine lesion.

According to embodiments of the present invention, the substrate comprises an oligonucleotide sequence as set forth in SEQ ID NO: 5 annealed to an oligonucleotide sequence as set forth in SEQ ID NO: 6.

According to embodiments of the present invention, the determining the SMUG1 catalytic activity is effected using an oligonucleotide having a 5'-hydroxymethyuracil lesion.

According to embodiments of the present invention, the determining the TDG catalytic activity is effected using an oligonucleotide having a 5-carboxylcytosine (caC) lesion or a 5-formylcytosine (5fC) lesion.

According to embodiments of the present invention, the determining the NEIL catalytic activity is effected using an oligonucleotide having a spiroidiminohydantoin (Sp) lesion.

According to embodiments of the present invention, the immune checkpoint regulator comprises a checkpoint inhibitor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1:
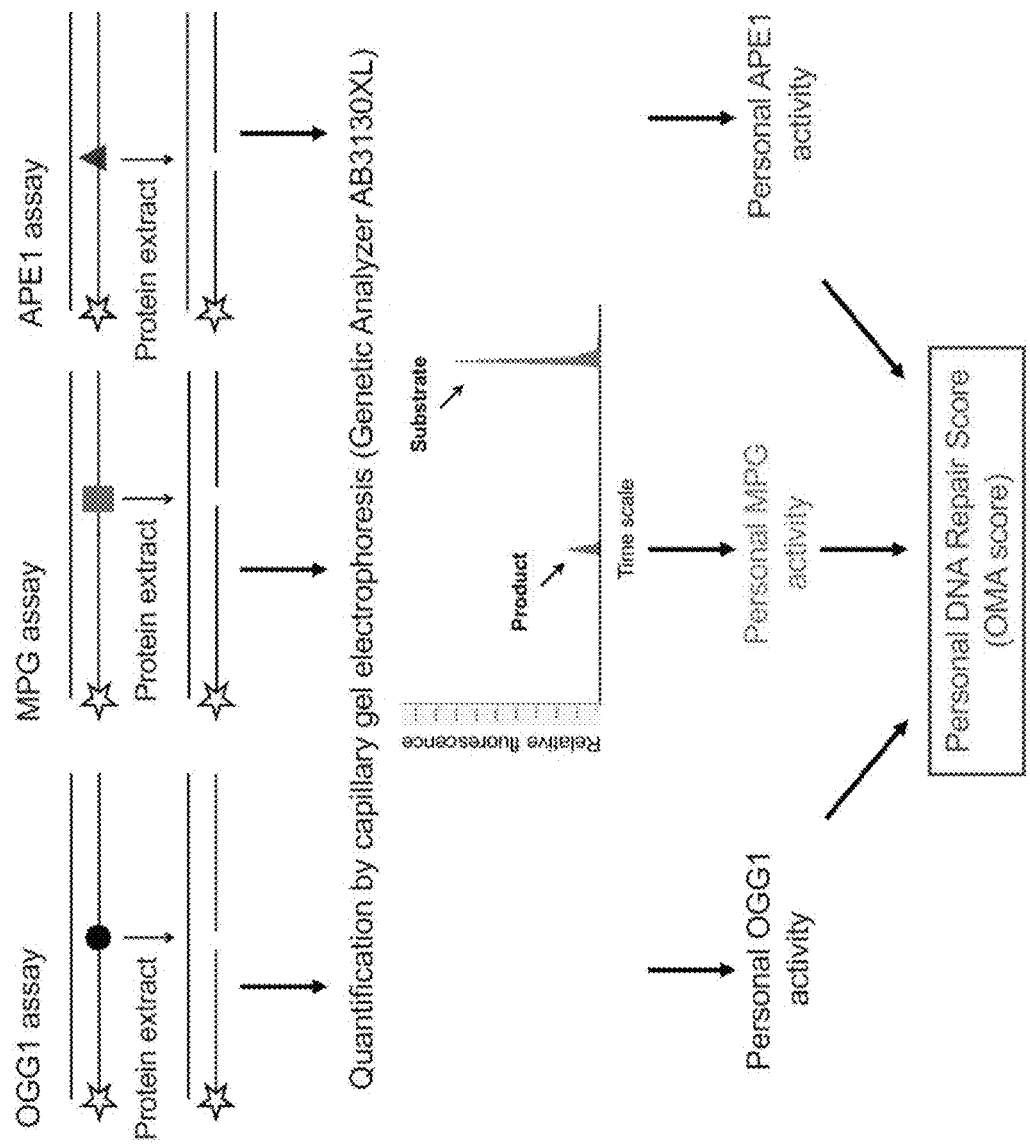

FIG. 1. Outline of the panel of DNA repair assays used to determine the personal DNA repair score. Each assay measures the activity of a specific DNA repair enzyme, in a protein extract prepared from PBMC, to remove its target DNA damage from a synthetic short oligonucleotide, shown schematically in the upper panel. Each enzyme assay was run separately, under optimized conditions. The target damaged base in each substrate oligonucleotide were: 8-oxoguanine in the OGG1 assay (illustrated by a black circle), hypoxanthine in the MPG assay (orange square) and a furanyl abasic site in the APE1 assay (blue triangle). The asterisks represent a 3'-Yakima Yellow fluorescence tag. Assays were run in a robotic platform, and analyzed in a AB3130XL genetic analyzer. The personal OGG1, MPG and APE1 enzyme activities were then used to calculate the personal DNA repair score for each subject, as described under Methods.

Figure 2:
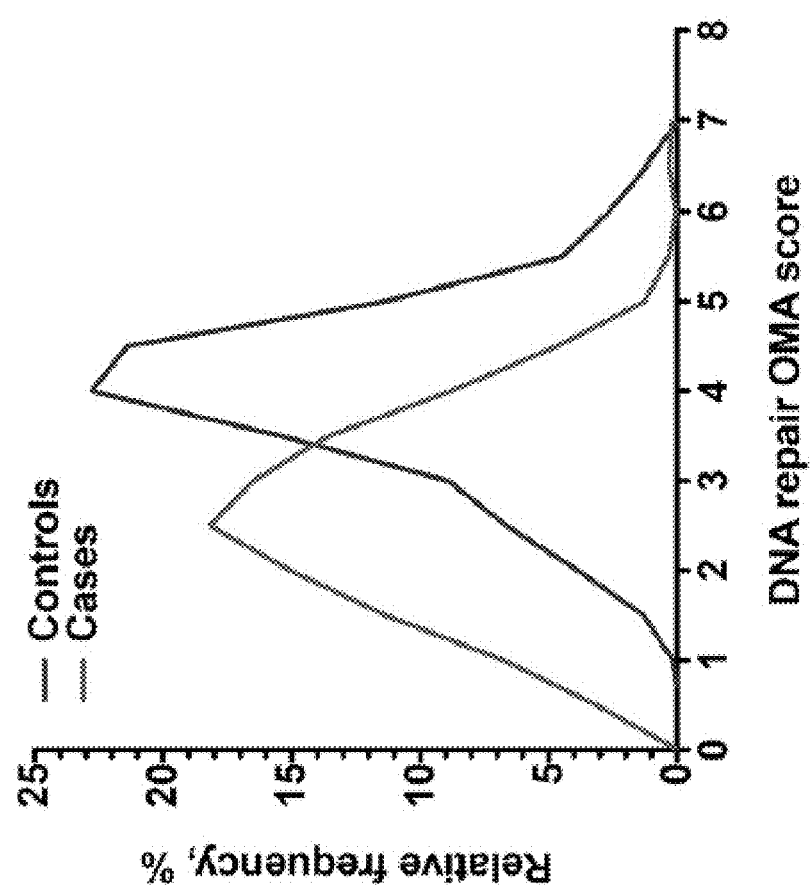
Figure 3A:
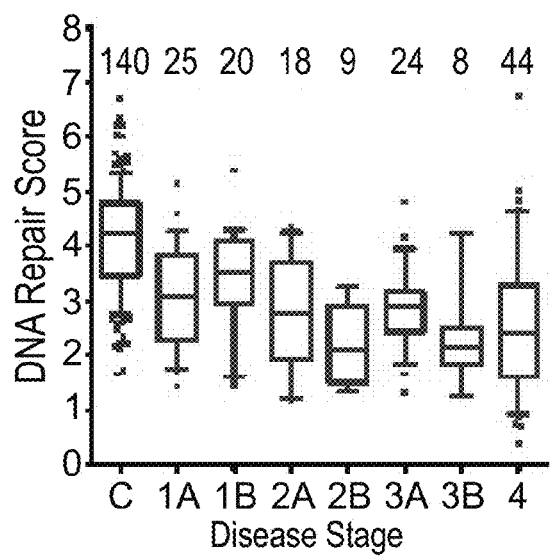
Figure 3B:
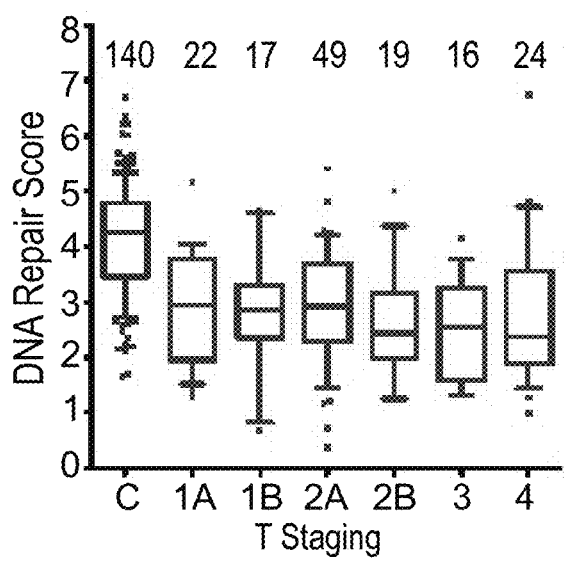
Figure 3C:
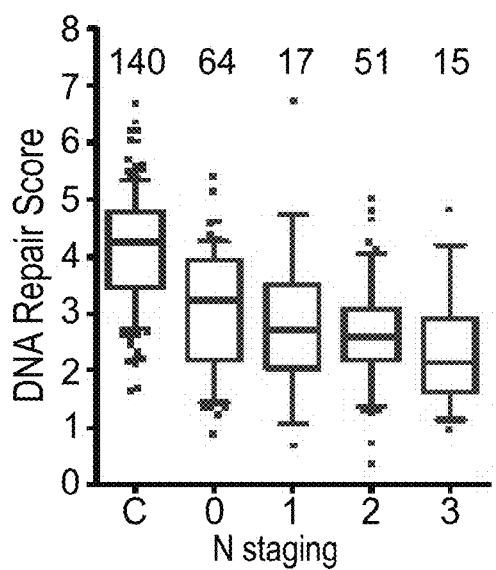
Figure 3D:
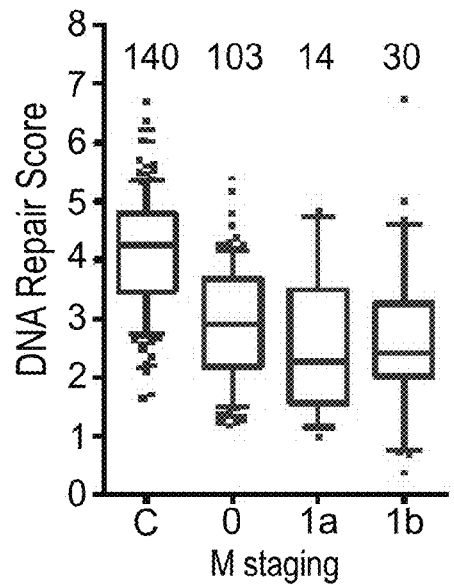

FIG. 2. DNA repair score distribution among lung cancer cases and control subjects. The frequency distribution of DNA repair scores is shown for 149 lung cancer patients (red curve) and 140 controls subjects (blue curve). The graphs were plotted using GraphPad Prism version 5.00, with bin width automatically chosen by the software, with $2^{nd}$ order smoothing, with two neighbours on each size. Bin width was 0.5 units.

FIGS. 3A-D. Analysis of the DNA repair scores by disease staging. The distributions of the DNA repair scores are presented for the control subjects (C, in Blue) and for the lung cancer patients by stage status (in red) using boxplots (whiskers 10-90 percentile) showing the values lower than the first $10^{th}$ percentile and greater than the $90^{th}$ percentile as dots, with the line in the middle plotted at the median. Distributions are presented by disease state (A), T staging (B), N staging (C) and M staging (D). The number of subjects in each sub-group is indicated above the plots. Importantly, the differences between the control groups and each of the earliest staging in each category is statistically significant. C vs. Disease Stage 1A, P=0.0009; C vs. T 1A, P=0.011; C vs. N 0, P<0.0001; C vs. M 0, P<0.0001. All P values were adjusted for gender, age and smoking status. Related numerical values are presented in Table 5, where the means and standard deviations are shown. The graphs were plotted using GraphPad Prism version 5.00.

Figure 4A:
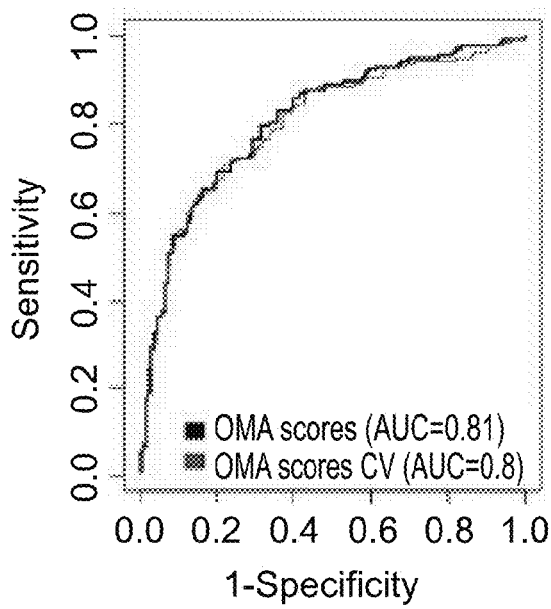
Figure 4B:
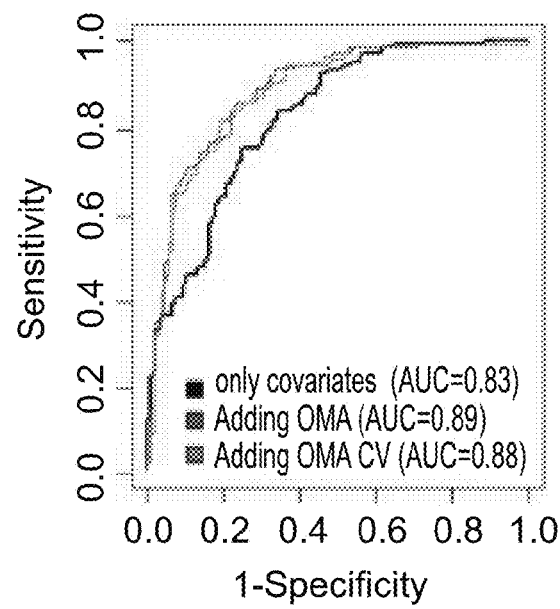
Figure 4C:
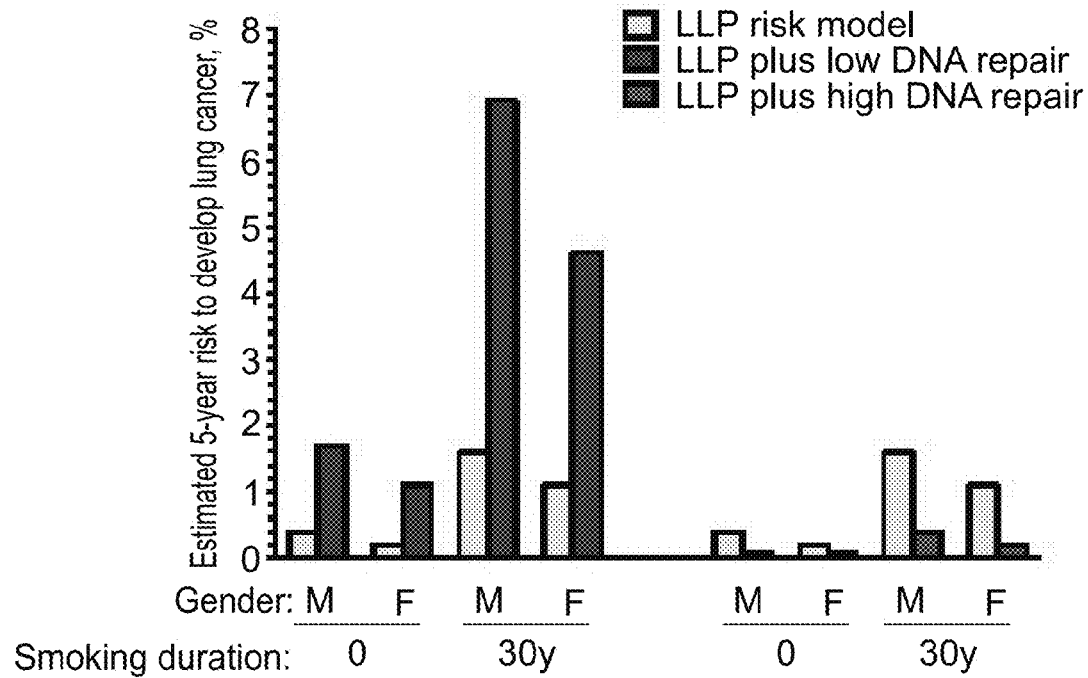

FIGS. 4A-C. Receiver Operating Characteristic (ROC) curve of the sensitivity and specificity of the DNA repair score in lung cancer risk and examples of its added value. A. ROC curve for the DNA repair scores obtained in the current study (black curve), and after cross-validation (red curve). B. ROC curve for the covariates age, sex and smoking status (black curve) and after adding the DNA repair score to these basic covariates before (red curve) and after (green curve) cross-validation. C. Estimated added value of the DNA repair score to lung cancer risk estimates based on Liverpool Lung Project Risk Model (LLP). Estimates are presented for a male and female, age 65, who are either never smokers or smoked for 30 years. Grey columns represent the 5-year risk according to the LLP model. The effect of having a low DNA repair score of ≤5th percentile (red columns), or a high DNA repair score of ≥$75^{th}$ percentile (blue columns) are presented. Data was taken from Table 3.

Figure 5:
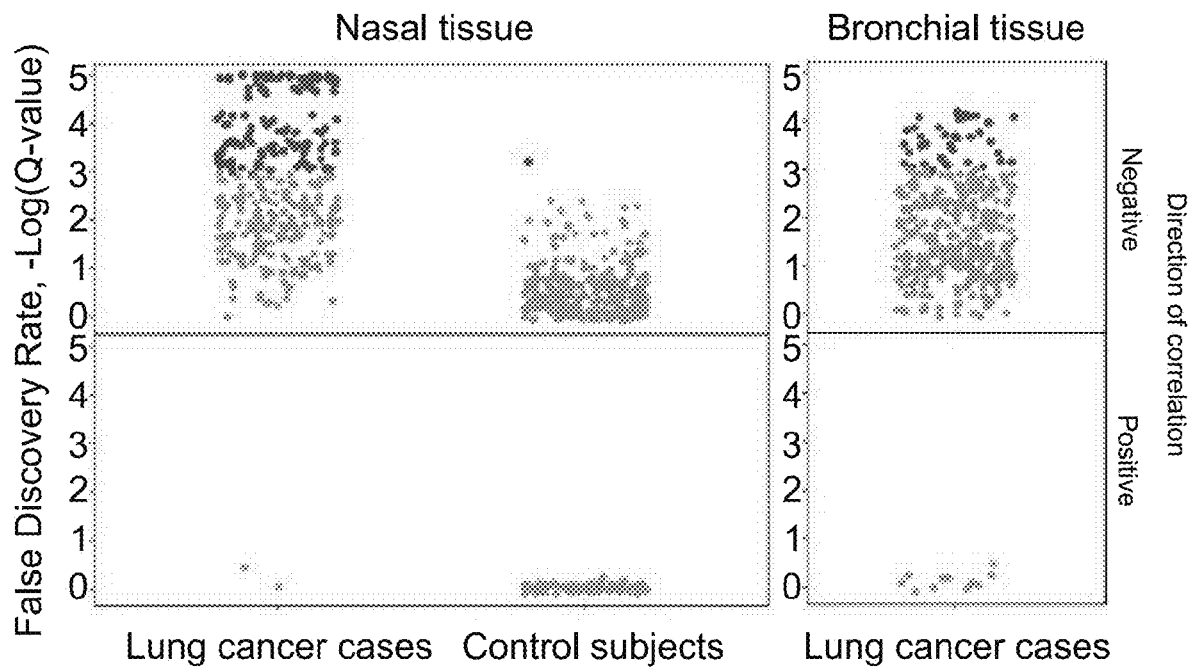

FIG. 5. Enrichment of immune system related pathways with low DNA repair score using gene set enrichment analysis (GSEA). Genes ranked by the RNAseq2 analysis according to their correlation to the DNA repair score were analyzed by GSEA to identify pathways (using GO terms) which significantly correlate with the DNA repair score. The analysis was performed separately for cases and controls. This leads to a list of pathways ranked according to their normalized enrichment score, the top 30 of which are shown in Table 2A. The figure presents for each tissue and health state all the 366 immune system-related pathways as found by the GSEA analysis (according to keywords presented in Table 2A). Each dot represents a pathway, with its Y axis value showing the FDR-Log (Q-Value) for the enrichment score. The pathways were colored according to their FDR values: gray dots Q-Value>0.001, red dots Q-Value≤0.001. Negatively- and positively-enriched pathways are shown for nasal and bronchial tissues, in cases and control subjects, as indicated.

Figure 6:
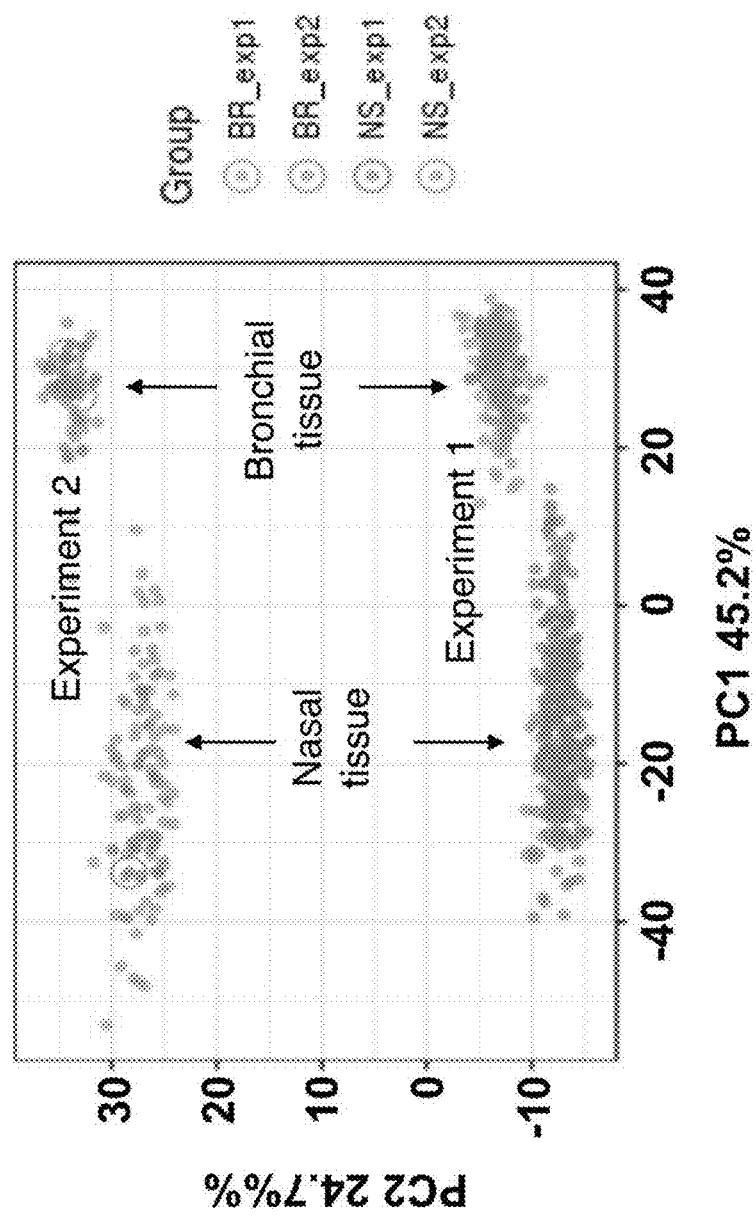

FIG. 6. Principle component analysis to detect the main sources of variation in the RNAseq data. NS, nasal samples; BR, bronchial samples; exp1, experiment 1, exp2, experiment 2.

FIGS. 7A-I. Differential expression analysis relative to DNA repair OMA score for all available groups (Cases/Controls)×(Nasal/Bronchial) is presented by volcano plots. Grey dots represent non-annotated genes; Red dots represent genes from the inflammatory response pathway; Blue dote represents genes from the skeletal system development pathway.

FIGS. 8A-B. Analysis of the robustness of the correlation between low DNA repair OMA score and upregulation of immune-system related pathways. A. Effect of extreme OMA score trimming on the enrichment of immune system pathways with low DNA repair score using gene set enrichment analysis (GSEA). Trimming was performed separately for nasal samples from cases and controls by removing samples with DNA repair OMA values in the 3.5% extreme OMA values from both sides. Genes from the trimmed sub-groups were ranked by the RNAseq2 analysis according to their correlation to the DNA repair score, and analyzed by GSEA to identify pathways (using GO terms) which significantly correlate (negative or positive correlation) with the DNA repair score. The figure represents all Immune system related pathways (depicted by the list of keywords presented in Table 2B) found in the GSEA analysis, with Y axis value showing the FDR-Log (Q-Value) for the enrichment score. The pathways were colored according to their FDR values: gray dots Q-Value>0.001, red dots Q-Value<0.001. B. Sub-sampling analysis of the GSEA results. Analysis was performed on each of 100 simulations of random sub-sampling of 80% of the sample size. The graph presents the distribution, among the 100 simulations, of immune system-related pathways which had a stringent P-value of <0.001.

Figure 9:
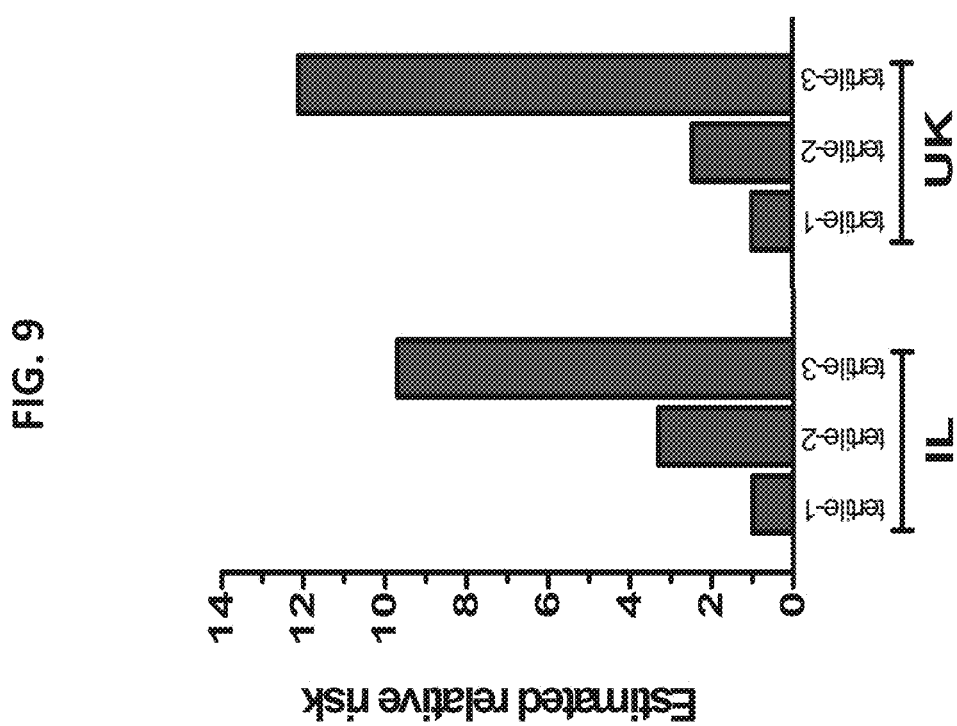

FIG. 9. Comparison of association of low DNA repair score with lung cancer in the UK and Israeli (IL) studies. Results of logistic regression, in which odds ratios were estimated for the continuous DNA repair score variable and categorized into 3 groups. IL, results taken from the Israeli study (2); UK, results were taken from Table 6.

Figure 10:
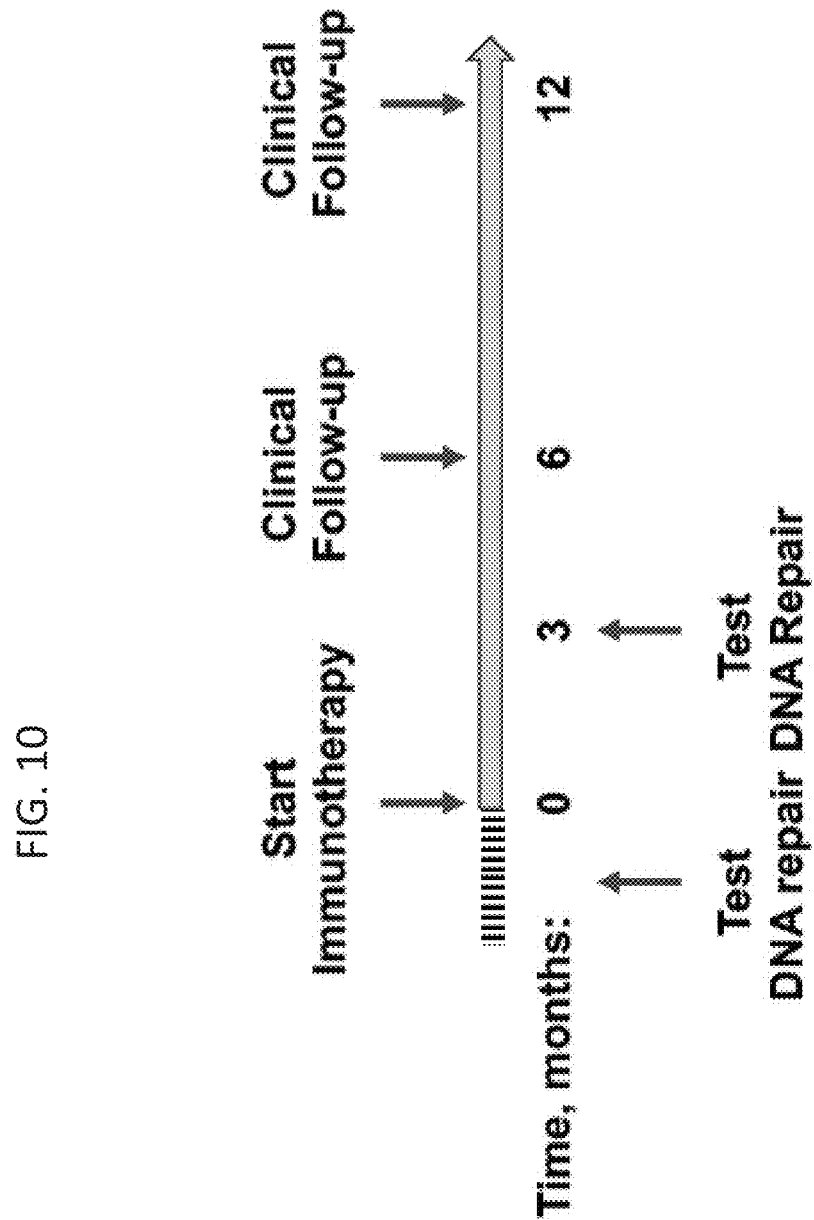

FIG. 10 is a timeline of a study planned for 60 stage 4 non-small cell lung cancer patients with high PD-L1 expression (≥50%). DNA repair will be measured before treatment, and for 20 patients also 3 months after beginning of treatment. The latter is to examine whether immunotherapy affects the measurement of DNA repair. Full clinical follow-up will be performed 6 and 12 months after the beginning of immunotherapy.

FIG. 11 are graphs illustrating the performance of the DNA repair tests for the enzymes NEIL1, SMUG1 and TDG. Enzyme activity shows reproducible and linear dependence on reaction time and protein concentrations under the optimized reaction conditions.

DESCRIPTION OF SPECIFIC EMBODIMENTS OF THE INVENTION

The present invention, in some embodiments thereof, relates to a method of predicting response of lung cancer patients to immunotherapy and more specifically to immune checkpoint regulators.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The present inventors have previously uncovered that elevated catalytic activity of the DNA repair enzyme, N-methylguanine DNA glycosylase (MPG), when assayed in a biological sample of a subject, is indicative of increased risk for developing lung cancer. In addition, the present inventors discovered that reduced enzymatic activity of the DNA repair enzyme 8-oxoguanine DNA glycosylase (OGG1); or apurinic-apyrimidinic site endonuclease (APE1) when assayed in a biological sample of a subject is a valuable risk factor for lung cancer. The present inventors generated an integrated DNA repair score based on the level of each of these markers (OGG, MPG, APE; (OMA)) which served as an efficient way of measuring risk of lung cancer (WO2013/035071).

Whilst analyzing the relationship between the DNA repair score and gene expression, as determined by RNAseq, the present inventors have now uncovered that low DNA repair score correlates with upregulation of immune system pathways in lung cancer patients, but not in control subjects.

The present inventors therefore deduce that these markers may serve as biomarkers for response to immune checkpoint regulators in cancer patients.

The present inventors have further uncovered additional DNA repair enzymes that may potentially serve as biomarkers for response to immune checkpoint regulators in cancer patients.

Thus, according to a first aspect of the present invention, there is provided a method of selecting a treatment for a subject having cancer, the method comprising:
(a) determining a level of catalytic activity of at least one DNA repair enzyme selected from the group consisting of N-methylpurine DNA glycosylase (MPG), apurinic/apyrimidinic endonuclease 1 (APE1), 8-oxoguanine DNA glycosylase (OGG1), Nei Like DNA Glycosylase 1 (NEIL1), Single-Strand-Selective Monofunctional Uracil-DNA Glycosylase 1 (SMUG1) and Thymine DNA Glycosylase (TDG) in a biological sample of the subject; and
(b) selecting an immune checkpoint regulator as a treatment for a subject having a statistically significant different level of catalytic activity of the DNA repair enzyme as compared to the catalytic activity of the DNA repair enzyme in a biological sample of a healthy subject.

As used herein, the term "subject" refers to a mammalian subject (e.g. human) who has been diagnosed as having cancer (e.g. lung cancer). In some embodiments, the cancer patient is a patient diagnosed with cancer on the basis of imaging, biopsy, staging, etc. In one embodiment, the subject typically exhibits suspicious clinical signs of lung cancer or cancer in general (e.g., persistent cough, hemoptysis, chest pain, shortness of breath, pleural effusion, wheezing, hoarseness, recurrent bronchitis or pneumonia, bone pain, paraneoplastic syndromes, unexplained pain, sweating, unexplained fever, unexplained loss of weight up to anorexia, anemia and/or general weakness).

Exemplary cancers for which the treatment may be selected include, but are not limited to, adrenocortical carcinoma, hereditary; bladder cancer; breast cancer; breast cancer, ductal; breast cancer, invasive intraductal; breast cancer, sporadic; breast cancer, susceptibility to; breast cancer, type 4; breast cancer, type 4; breast cancer-1; breast cancer-3; breast-ovarian cancer; Burkitt's lymphoma; cervical carcinoma; colorectal adenoma; colorectal cancer; colorectal cancer, hereditary nonpolyposis, type 1; colorectal cancer, hereditary nonpolyposis, type 2; colorectal cancer, hereditary nonpolyposis, type 3; colorectal cancer, hereditary nonpolyposis, type 6; colorectal cancer, hereditary nonpolyposis, type 7; dermatofibrosarcoma protuberans; endometrial carcinoma; esophageal cancer; gastric cancer, fibrosarcoma, glioblastoma multiforme; glomus tumors, multiple; hepatoblastoma; hepatocellular cancer; hepatocellular carcinoma; leukemia, acute lymphoblastic; leukemia, acute myeloid; leukemia, acute myeloid, with eosinophilia; leukemia, acute nonlymphocytic; leukemia, chronic myeloid; Li-Fraumeni syndrome; liposarcoma, lung cancer; lung cancer, small cell; lymphoma, non-Hodgkin's; lynch cancer family syndrome II; male germ cell tumor; mast cell leukemia; medullary thyroid; medulloblastoma; melanoma, meningioma; multiple endocrine neoplasia; myeloid malignancy, predisposition to; myxosarcoma, neuroblastoma; osteosarcoma; ovarian cancer; ovarian cancer, serous; ovarian carcinoma; ovarian sex cord tumors; pancreatic cancer; pancreatic endocrine tumors; paraganglioma, familial nonchromaffin; pilomatricoma; pituitary tumor, invasive; prostate adenocarcinoma; prostate cancer; renal cell carcinoma, papillary, familial and sporadic; retinoblastoma; rhabdoid predisposition syndrome, familial; rhabdoid tumors; rhabdomyosarcoma; small-cell cancer of lung; soft tissue sarcoma, squamous cell carcinoma, head and neck; T-cell acute lymphoblastic leukemia; Turcot syndrome with glioblastoma; tylosis with esophageal cancer; uterine cervix carcinoma, Wilms' tumor, type 2; and Wilms' tumor, type 1, etc.

Preferably, the cancer is selected from the group consisting of lung cancer, head and neck cancer, breast cancer, bladder cancer, glioblastoma, osteosarcoma, pancreatic cancer, ovarian cancer and cervical cancer. The cancer may be metastatic or non-metastatic.

According to a particular embodiment, the cancer is lung cancer (e.g. small cell lung cancer (SCLC)).

As used herein, the term "lung cancer" refers to any cancerous growth in the lung. In some embodiments, the lung cancer is small cell lung cancer (SCLC), or non-small cell lung cancer (NSCLC), characterized by the cell size when viewed under the microscope. The lung cancer may be adenocarcinoma (including bronchoalveolar cell carcinoma), squamous cell carcinoma or large cell carcinoma. The lung cancer may be of a rare cell type, such as carcinoid tumors and lymphoma.

The method is preferably carried out ex vivo—i.e. on a biological sample removed from the subject.

As used herein, the phrase "biological sample" refers to, but is not limited to a sample of a tissue, a cell or cells, fluid of the subject and the like. In some embodiments, the biological sample is a scraped cell sample, a blood sample, or a biopsy sample. In some embodiments, the biological sample is a blood sample, for example, a whole blood sample, a blood cell sample or a serum sample. In still other embodiments, the sample is a peripheral blood cell sample.

As used herein, the phrase "peripheral blood cell sample" refers to a sample taken from circulating blood as opposed to blood cells within the lymphatic system, spleen, liver, or bone marrow. Peripheral blood comprises erythrocytes, leukocytes and platelets. In some embodiments, the biological sample comprises isolated blood cells, for example, isolated mononuclear cells. In some embodiments, the peripheral blood sample is a peripheral blood mononuclear cell sample, prepared from whole peripheral blood.

Peripheral blood cell samples are typically taken with a syringe with a needle, and/or with an evacuated container (e.g. Vacutainer®) and a needle. Samples may also be taken from blood collection bags.

In some embodiments the blood sample comprises T cells. The T cells may be derived from peripheral blood or from whole blood. In one embodiment, the T cells are expanded ex vivo. T cell expansion may be carried out in the presence of anti-CD3 and anti-CD28 antibodies, as well as IL2 (e.g. for at least 2 days, preferably 4), followed by proliferation for at least 5 days, preferably 10 days in the presence of interleukin 2 (IL2). The T cell expansion process can be performed either manually, or automated in a robotic platform.

In some embodiments of the present invention, catalytic activity is determined from a fresh biological sample. As used herein, the term "fresh" refers to a sample which has not been preserved prior to assay of catalytic activity. In some embodiments, the fresh sample is assayed <1 hour from its removal from the subject. In yet another embodiment, the fresh sample is assayed about 1 hour, about 2 hours, about 3, about 4, about 5, about 6, about 8, about 10, about 12 about 18, about 24 hours, about 1 day, about 2 days, about 3 days or more from removal from the subject. In other embodiments of the present invention, the sample is a processed sample. As used herein, the phrase "processed sample" refers to a sample which has been treated, after removal from the subject, in order to isolate, purify, alter and/or preserve a component or components of the sample. For example, in some aspects of some embodiments of the present invention, the sample is an extract of peripheral blood cells. In yet further embodiments, catalytic activity is determined in a whole cell extract or protein extract of the peripheral blood cells, for example, in a protein extract of peripheral blood mononuclear cells.

In some aspects of embodiments of the present invention, the sample is a preserved sample, such as, but not limited to, a refrigerated sample or a cryopreserved protein extract of peripheral blood mononuclear cells. Methods for preservation of samples, without significant deterioration in their enzyme activity are known in the art.

Measuring the catalytic activity of methylpurine DNA glycosylase (N-methylpurine DNA glycosylase, DNA 3-methyl adenineglycosylase II, MPG; EC 3.2.2.21) may be carried out using a substrate (e.g. an oligonucleotide or polynucleotide with at least one altered base).

Exemplary substrates for MPG include, but are not limited to, double stranded DNA with at least one strand bearing a hypoxanthine lesion (Hx), for example, SEQ ID NO: 1, or bearing a 1, N6-ethenoadenine lesion, for example, SEQ ID NO: 3.

Measuring the catalytic activity of 8-oxoguanine DNA glycosylase (OGG1) EC 3.2.2.23) may be carried out using a substrate (e.g. an oligonucleotide or polynucleotide with at least one altered base). Exemplary substrates for OGG1 include, but are not limited to, double stranded DNA with at least one strand bearing a 8oxoguanine lesion (8oxog), for example, SEQ ID NO: 11 (OGG1 substrate).

Measuring the catalytic activity of APE1 [apurinic-apyrimidinic (AP) site endonuclease, APEX1, EC 4.2.99.18] may be carried out using a substrate (e.g. an oligonucleotide or polynucleotide with at least one abasic site). Exemplary substrates for APE1 include, but are not limited to, double stranded DNA with at least one strand bearing a native abasic site, or a modified abasic site, such as furanyl abasic site (see for example, SEQ ID NO: 8).

The enzyme Neil Like DNA Glycosylase 1 (NEIL1, EC 4.2.99.18) has a preference for oxidized pyrimidines, such as thymine glycol, formamidopyrimidine (Fapy, FapyAde and FapyGua) and 5-hydroxyuracil and the hydantoin products spiroiminodihydantoin (Sp) and 5-guanidinohydantoin (Gh). Substrates include 5-OH—C; 5-OH—U: AT>G TgG; Guanidinohydantoin, guanidinohydantoin (ss), Iminoallantoin, Iminoallantoin (ss), Spiroiminodihydantoin, Spiroiminodihydantoin (ss), 5-hydroxy-5-methylhydantoin, 5,6-Dihydro-T, 5,6-Dihydro-U: G=C=A>T, FapyG: C, 8-Oxo-G: C=G>T>A, FapyA: T, (5'R)-8,5'-Cyclo-2'-deoxyadenosine, (5'S)-8,5'-Cyclo-2'-deoxyadenosine, 8-Oxo-A: C. NEIL1 specifically binds 5-hydroxymethylcytosine (5hmC).

Measuring the catalytic activity of NEIL1 may be carried out using a substrate (e.g. an oligonucleotide or polynucleotide with any of the above disclosed substrates). An exemplary substrates for NEIL1 includes, but is limited to, double stranded DNA with at least one strand bearing a site specific spiroidiminohydantoin (Sp) (see for example, the combination of SEQ ID NO: 12 annealed to 14 or the combination of SEQ ID NO: 13 annealed to SEQ ID NO: 14).

The enzyme Single-Strand-Selective Monofunctional Uracil-DNA Glycosylase 1 (SMUG1, EC 3.2.2, EC 3.2.2.-) excises uracil (U), 5-formyluracil (fU) and uracil derivatives bearing an oxidized group at C5 [5-hydroxyuracil (hoU) and 5-hydroxymethyluracil (hmU)] in ssDNA and dsDNA. It also excise 5-Fluorouracil: G, 5-chlorouracil: G, 5-Carboxyuracil: G, isodialuric acid (5,6-dihydroxyuracil) and alloxan.

Measuring the catalytic activity of Single-Strand-Selective Monofunctional Uracil-DNA Glycosylase 1 may be carried out using a substrate (e.g. an oligonucleotide or polynucleotide with at least one of the above disclosed groups). Exemplary substrates for SMUG1 include, but are not limited to, double stranded DNA with at least one strand bearing 5'-hydroxymethyuracil (HmU) (see for example, the combination of SEQ ID NO: 15 annealed to SEQ ID NO: 17 or the combination of SEQ ID NO: 16 annealed to SEQ ID NO: 17).

The enzyme Thymine DNA Glycosylase (TDG, EC 3.2.2.29) excises 5-formylcytosine (5fC) and 5-carboxylcytosine (5caC) in the context of CpG sites, 5-hydroxymethyluracil (5hmU) when paired with G. Remove T from G/T C/T and T/T mispairs (mismatches). It can also remove uracil and 5-halogenated pyrimidines such as 5-fluorouracil, 5-bromouracil and 5-chlorouracil, 5-iodouracil, 5-fluorocytosine and 5-bromocytosine from mispairs with guanine. In addition it may repair ethenoC: G, hypoxanthine: G, ethenoC: A, Tg: G thymine glycol (Tg) and 5-formyl-U.

Measuring the catalytic activity of TDG may be carried out using a substrate (e.g. an oligonucleotide or polynucleotide with at least one of the above disclosed groups). Exemplary substrates for TDG include, but are not limited to, double stranded DNA with at least one strand bearing 5-carboxylcytosine (caC) (see for example, the combination of SEQ ID NO: 18 annealed to SEQ ID NO: 20 or the combination of SEQ ID NO: 19 annealed to SEQ ID NO: 20).

Methods for preparation of oligonucleotide substrates for assaying DNA repair enzymes are well known in the art. Oligonucleotides designed according to the teachings of the present invention can be generated according to any oligonucleotide synthesis method known in the art such as enzymatic synthesis or solid phase synthesis. Equipment and reagents for executing solid-phase synthesis are commercially available from, for example, Applied Biosystems. Any other means for such synthesis may also be employed; the actual synthesis of the oligonucleotides is well within the capabilities of one skilled in the art and can be accomplished via established methodologies as detailed in, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988) and "Oligonucleotide Synthesis" Gait, M. J., ed. (1984) utilizing solid phase chemistry, e.g. cyanoethyl phosphoramidite followed by deprotection, desalting and purification by for example, an automated trityl-on method or HPLC.

The DNA substrate can be a short section of double stranded DNA, comprising about 5, about 10, about 15, about 20, about 25, about 30, about 32, about 35, about 37, about 39, about 40, about 45, about 50, about 75, about 100 or more base pairs and at least one of the lesions recognized by the enzyme activity to be assayed. In one particular embodiment the DNA substrates bear single lesions and are 30-40 base pairs in length. Alternatively, or additionally, the DNA substrate can be a large section of DNA, such as a plasmid, comprising thousands or more base pairs and bearing the substrate lesion(s). DNA substrates bearing multiple lesions include, but are not limited to, substrates having multiple lesions of identical type (for example, Hx or &A or 8oxoG), or complex substrates having one or more lesions of least two different types (for example, Hx and eA, or Hx and 8oxoG, or eA and 8oxoG).

A substrate of the invention can thus have at least one lesion of at least one type or at least one lesion of at least two types (complex substrate), the lesions preferably being positioned at predetermined site(s) in the DNA substrate. The lesion(s) for MPG substrate can be of any type, including, but not limited to, 3-methyladenine, 7-methyladenine, 3-methylguanine, 7-methylguanine, hypoxanthine, 1, N6-ethenoadenine and 1,N2-ethenoguanine. Lesions for APE1 assay include any abasic site, including but not limited to furanyl abasic site. Lesions for OGG1 assay include, but are not limited to 2,5-amino-5-formamidopyrimidine and 7,8-dihydro-8-oxoguanine.

A lesion can be introduced at a unique and defined location (site) in a DNA molecule using solid phase DNA synthesis, using in sequence the four conventional phosphoramidite building blocks used in the synthesis of oligodeoxynucleotides and additional at least one modified phosphoramidite building block, which when introduced into the DNA introduces a lesion therein, which lesion is recognizable by a DNA repair enzyme. In the alternative, a DNA molecule is exposed to a mutagenic agent (e.g., an oxidative agent or UV radiation) which forms one or more lesion of one or more types therein. Even when using this method, one can select a pre-substrate which will result in a product (substrate of the invention) in which the lesions are non-randomly distributed, since the extent by which a specific lesion is formed in DNA is often dependent on the DNA sequence.

Other alternatives also exist. For example, one can oxidize a plasmid DNA with an oxidizing agent. This will form several lesions in the plasmid DNA. One can now use this plasmid DNA to assay a repair enzyme that acts on this DNA, without knowing precisely where the lesions are. The enzyme will produce a nick in the DNA, and this will convert the plasmid from the supercoiled closed form to the nicked (open circular) form. These two can be easily distinguished by gel electrophoresis or gradient centrifugation. In another example a sequence of DNA is enzymatically synthesized in the presence of lesioned building blocks. Other alternatives are also known, such as chemical deamination, etc.

Detection of DNA glycosylase or AP endonuclease activity can be effected, for example, by monitoring the creation of abasic sites, or by monitoring the sensitivity of the abasic DNA to breakage (for example, nicking by alkali treatment), or by monitoring the nicking activity of the AP endonucleases, converting the substrates to shorter oligonucleotide products. Detection of DNA repair enzyme activity can be effected by employing a DNA substrate of defined length, bearing a desired lesion at a predetermined site, and detection of breakage by monitoring the appearance of breakage products (fragments) of expected length.

Detection of enzyme activity can be effected by detection of presence of conversion products, for example, fragments of specific length, sequence, properties and the like. Various methods and devices for detection of DNA repair enzyme activity are well known in the art, and are detailed, for example, in U.S. Pat. Application Pub. No. 2007-0269824 to Albrecht et al. and U.S. Pat. Application Pub. Nos. 2003-0104446 and 2006-0147929 to Sauvaigo S.

According to some embodiments, the substrate DNA is labeled and monitoring of the conversion of substrate DNA to products is effected by detection of the label in specific sized DNA fragments. The oligonucleotide or polynucleotide substrates used by the present invention can be labeled either directly or indirectly using a tag or label molecule. Such labels can be, for example, fluorescent molecules (e.g., Yakima Yellow, fluorescein or Texas Red), radioactive molecule (e.g., $^{32}P$-γ-ATP or $^{32}P$-α-ATP) and chromogenic substrates [e.g., Fast Red, BCIP/INT, available from (AB-CAM, Cambridge, MA)]. Direct labeling can be achieved by covalently conjugating a label molecule to the substrate (e.g., using solid-phase synthesis) or by incorporation via polymerization (e.g., in a T4 polynucleotide kinase reaction, using an in vitro DNA synthesis reaction or random-primed labeling). Indirect labeling can be achieved by covalently conjugating or incorporating to the substrate a non-labeled tag molecule (e.g., Digoxigenin or biotin) and subsequently subjecting it to a labeled molecule (e.g., anti-Digoxigenin antibody or streptavidin) capable of specifically recognizing the non-labeled tag.

It will be appreciated that the marker or label moiety should be a marker or label affording efficient, specific and cost-effective detection, with acceptable levels of safety in handling, but also devoid of artifact-producing alterations of the substrate. Reaction products can be detected using a variety of DNA detection methods such as Southern blot analysis, PCR, fluorometry, sequencing and the like. In specific embodiments, detection of radioactive DNA reaction products is effected following denaturation, by denaturing (e.g. urea) PAGE and visualization of the denatured fragments by phosphorimagery. In some embodiments, the detection of fluorescent reaction products is effected by automated monitoring of the fluorescence of the denatured fragments of the reaction mixture using capillary gel electrophoresis, for example, on the ABI3130XL genetic analyzer (Applied Biosystems, Foster City, CA).

Alternately and optionally, the DNA repair enzyme protein can be quantitated in the sample, or sample extract. Quantitation of the presence of DNA repair enzyme in the sample can be effected via specific antibodies (polyclonal and/or monoclonal) using immunological techniques such as Western blotting, ELISA, and the like.

As used herein, the phrase "predetermined value" refers to a reference level of catalytic activity above (as in the case of MPG) or below (as in the case of OGG1 or APE1) which increased likelihood of a lung cancer subject responding to an immune checkpoint regulator can be statistically inferred.

According to particular embodiments, the predetermined reference value or range is derived from a previous level or plurality of levels of enzyme activity measured in the subject, prior to diagnosis of the lung cancer. In yet another embodiment, the predetermined reference value or range is derived from control subjects who do not have lung cancer (e.g. healthy subjects). The control subjects may be matched for particular parameters including but not limited to age, weight and/or sex. In particular embodiments, the predetermined value is a median-20 of values from the control reference population.

Methods of determining the predetermined value for each of the markers are disclosed in WO2013/035071, the contents of which are incorporated herein by reference.

In one embodiment, at least the enzymes MPG, APE1 and OGG1 are measured.

In another embodiment, the enzymes MPG, APE1 and OGG1 are measured, together with NEIL1.

In another embodiment, the enzymes MPG, APE1 and OGG1 are measured, together with SMUG1.

In another embodiment, the enzymes MPG, APE1 and OGG1 are measured, together with TDG.

In another embodiment, the enzymes MPG, APE1 and OGG1 are measured, together with NEIL1 and SMUG1.

In another embodiment, the enzymes MPG, APE1 and OGG1 are measured, together with NEIL1 and TDG.

In another embodiment, the enzymes MPG, APE1 and OGG1 are measured, together with SMUG1 and TDG.

In another embodiment, the enzymes MPG, APE1 and OGG1 are measured, together with NEIL1, SMUG1 and TDG.

In one embodiment, an integrated DNA repair score is calculated for the combination of MPG, APE1 and OGG1.

In another embodiment, an integrated DNA repair score is calculated for the combination of MPG, APE1, OGG1 and NEIL1.

In another embodiment, an integrated DNA repair score is calculated for the combination of MPG, APE1, OGG1 and SMUG1.

In another embodiment, an integrated DNA repair score is calculated for the combination of MPG, APE1, OGG1 and TDG.

In another embodiment, an integrated DNA repair score is calculated for the combination of MPG, APE1, OGG1, NEIL1 and SMUG1.

In another embodiment, an integrated DNA repair score is calculated for the combination of MPG, APE1, OGG1, NEIL1 and TDG.

In another embodiment, an integrated DNA repair score is calculated for the combination of MPG, APE1, OGG1, SMUG1 and TDG.

In another embodiment, an integrated DNA repair score is calculated for the combination of MPG, APE1, OGG1, NEIL1, SMUG1 and TDG.

The integrated DNA repair score may be formulated as the sum of the log odds ratio estimate from logistic regression of (with smoking status in the model), multiplied by the observed value of the sample, e.g. integrated DNA repair (OMA) score=(log odds ratio estimate for OGG1×OGG1 observed value)+ (log odds ratio estimate for MPG×MPG observed value)+ (log odds ratio estimate for APE1×APE1 observed value). A reduced integrated DNA repair (OMA) score, relative to the control population, is indicative of higher probability of responding to an immune checkpoint regulator.

As used herein, the phrase "immune checkpoint regulator" refers to an agent that promotes activation of T cells by regulating a function of an immune checkpoint molecule. The term "immune checkpoint molecule" includes both receptors and ligands that function as an immune checkpoint.

Immune checkpoints are the immune escape mechanism to prevent the immune system from attacking its own body. Immune checkpoint receptors are present on T cells, and interact with ligands expressed on antigen-presenting cells. T cells recognize an antigen presented on the MHC molecule and are activated to generate an immune reaction, whereas the activation of T cells is controlled by an interaction between immune checkpoint receptor and ligand that occurs in parallel. Immune checkpoint receptors include co-stimulatory receptors and inhibitory receptors, and the T cell activation and the immune reaction are controlled by a balance between both receptors.

In one embodiment, the immune checkpoint regulator is an antagonist against an inhibitory immune checkpoint molecule.

As used herein, the term "antagonist" refers to an agent that interferes with receptor activation induced by binding between receptor and ligand. Examples thereof include substances that interfere with the binding between receptor and ligand by binding to the receptor, and substances that interfere with the binding between receptor and ligand by binding to the ligand.

For example, "an antagonist against an inhibitory immune checkpoint molecule" may be an antagonistic antibody that binds to an inhibitory immune checkpoint molecule (inhibitory receptor or its ligand), a soluble polypeptide that is designed based on an inhibitory immune checkpoint ligand and does not activate the receptor, or a vector capable of expressing the polypeptide, or the like. Examples of the inhibitory immune checkpoint molecule include receptors such as PD-1, CTLA-4, LAG-3, TIM-3, and BTLA, and ligands such as PD-L1 (ligand for PD-1), PD-L2 (ligand for PD-1), CD80 (ligand for CTLA-4), CD86 (ligand for CTLA-4), GALS (ligand for TIM-3), and HVEM (ligand for BTLA). Methods of producing an antibody, and methods of producing a polypeptide by chemical synthesis or genetic engineering procedure are well-known conventional methods in the art, and a skilled person can prepare an antagonist against an inhibitory immune checkpoint molecule as described above by conventional methods.

In another embodiment, the immune checkpoint inhibitor is an agonist against a co-stimulatory immune checkpoint molecule An agonist against a co-stimulatory immune checkpoint molecule may be an agonistic antibody that binds to a co-stimulatory immune checkpoint receptor, a soluble polypeptide that is designed based on a co-stimulatory immune checkpoint ligand and has an effect to activate the receptor, or a vector capable of expressing the polypeptide, or the like. Examples of the co-stimulatory immune checkpoint molecule include receptors such as CD137, OX40, and GITR, and ligands such as CD137L (ligand for CD137), OX40L (ligand for OX40), and TNFSF18 (ligand for GITR).

The immune checkpoint molecule targeted by the immune checkpoint regulator may be, for example, at least one selected from CTLA-4, PD-L1, OX40, CD80, CD86, PD-1, LAG-3, TIM-3, BTLA, and GITR; at least one selected from CTLA-4, PD-L1, OX40, CD80, CD86, and PD-1; at least one selected from the group consisting of CTLA-4, PD-L1, OX40, BTLA, GITR, LAG-3, and TIM-3; at least one selected from CTLA-4, PD-L1, and OX40; or at least one selected from the group consisting of BTLA, GITR, LAG-3, and TIM-3.

The immune checkpoint regulator may be an antibody against an immune checkpoint molecule. Specific examples of the immune checkpoint regulator include antagonistic antibodies such as an anti-PD-1 antibody, anti-CTLA-4 antibody, anti-LAG-3 antibody, anti-TIM-3 antibody and an anti-BTLA antibody, which bind to a receptor to inhibit binding of a ligand to the receptor; and agonistic antibodies such as an anti-CD137 antibody, anti-OX40 antibody and an anti-GITR antibody, which bind to a receptor to stimulate a downstream signaling pathway. Other specific examples of the immune checkpoint regulator include an anti-PD-L1 antibody, anti-PD-L2 antibody, anti-CD80 antibody, anti-CD86 antibody, anti-GALS antibody and an anti-HVEM antibody, which bind to a ligand for an inhibitory immune checkpoint receptor to inhibit binding of the ligand to the receptor.

It will be appreciated that upon obtaining the catalytic activities of at least one of the enzymes MPG, APE1, OGG1, NEIL1, SMUG1 and TDG the present inventors contemplate treating the patients.

When the catalytic activity of MPG is above a first predetermined value, the level of catalytic activity of APE1 is below a second predetermined level and/or the level of catalytic activity of OGG1 is below a third predetermined level, the patient is treated with the immune checkpoint regulator.

In another embodiment, if the catalytic activity of MPG is below a first predetermined value, the level of catalytic activity of APE1 is above a second predetermined level and the level of catalytic activity of OGG1 is above a third predetermined level, the patient is treated with an agent that is not an immune checkpoint regulator.

Examples of therapeutic agents for treating lung cancer which are not immune checkpoint inhibitors are known in the art and include, for example surgery, laparoscopy, chemotherapy, radiotherapy, gene therapy, nutritional therapy and combination therapy.

It is expected that during the life of a patent maturing from this application many relevant immune checkpoint regulators will be developed and the scope of the term immune checkpoint regulator is intended to include all such new technologies a priori.

As used herein the term "about" refers to ±10%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Generally, the nomenclature used herein and the laboratory procedures utilized in the present invention include molecular, biochemical, microbiological and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells-A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Selected Methods in Cellular Immunology", W. H. Freeman and Co., New York (1980); available immunoassays are extensively described in the patent and scientific literature, see, for example, U.S. Pat. Nos. 3,791,932; 3,839,153; 3,850,752; 3,850,578; 3,853,987; 3,867,517; 3,879,262; 3,901,654; 3,935,074; 3,984,533; 3,996,345; 4,034,074; 4,098,876; 4,879,219; 5,011,771 and 5,281,521; "Oligonucleotide Synthesis" Gait, M. J., ed. (1984); "Nucleic Acid Hybridization" Hames, B. D., and Higgins S. J., eds. (1985); "Transcription and Translation" Hames, B. D., and Higgins S. J., eds. (1984); "Animal Cell Culture" Freshney, R. I., ed. (1986); "Immobilized Cells and Enzymes" IRL Press, (1986); "A Practical Guide to Molecular Cloning" Perbal, B., (1984) and "Methods in Enzymology" Vol. 1-317, Academic Press; "PCR Protocols: A Guide To Methods And Applications", Academic Press, San Diego, CA (1990); Marshak et al., "Strategies for Protein Purification and Characterization-A Laboratory Course Manual" CSHL Press (1996); all of which are incorporated by reference as if fully set forth herein. Other general references are provided throughout this document. The procedures therein are believed to be well known in the art and are provided for the convenience of the reader. All the information contained therein is incorporated herein by reference.

Materials and Methods

Study participants: Patients ≥18 years of age referred to Royal Papworth Hospital, Cambridge, Thoracic Oncology service for investigation of suspected lung cancer were recruited between October 2013 and November 2015. Those with a history of previous lower or upper airway cancer were excluded, as were patients with symptoms, who were initially recruited to the study but later were found to have no evidence for cancer. Control subjects were healthy volunteers recruited from the Cambridge BioResource, a panel of around 17,600 volunteers, both with and without health conditions, who are willing to be approached to participate in research studies. They were selected in an attempt to form a gender and age composition comparable to the cases group. Disease stage was reported according to the 7th edition of the TNM classification of malignant tumours (28). Table 1 summarizes the characteristics of cases and control subjects.

TABLE 1

| | Controls, No (%) (Total = 143) | Cases, No (%) (Total = 150) | P* |
|---|---|---|---|
| Gender | | | 0.291 |
| Male | 79 (55.2%) | 93 (62.0%) | |
| Female | 64 (44.8%) | 57 (38.0%) | |

TABLE 1-continued

| | Controls, No (%) (Total = 143) | Cases, No (%) (Total = 150) | P* |
|---|---|---|---|
| Age (mean ± SD) | 59.7 ± 10.0 | 68.6 ± 9.6 | <0.001 |
| Smoking status | | | <0.001 |
| Current | 48 (33.6%) | 62 (41.3%) | |
| Ex-smoker | 50 (35.0%) | 87 (58.0%) | |
| Never | 45 (31.5%) | 1 (0.7%) | |
| Packyears (mean ± SD) | 16.8 ± 20.3 | 43.2 ± 27.6 | <0.001 |
| Histology | | | — |
| Adeno | — | 83 (55.3%) | |
| Squamous | — | 59 (37.3%) | |
| NSCLC_NOS | — | 11 (7.3%) | |
| COPD | | | <0.001 |
| None | 112 (83.6%) | 56 (41.8%) | |
| Mild | 9 (6.7%) | 26 (19.4%) | |
| Moderate | 10 (7.5%) | 31 (23.1%) | |
| Severe | 3 (2.2%) | 16 (11.9%) | |
| Severity unknown | 0 (0.0%) | 5 (3.7%) | |

Specimens, protein extracts, DNA repair assays and RNAseq: Each participant donated 17 ml blood (two 8.5 ml ACD-vacutainers), from which, within 2-4 hours, PBMC were isolated by Ficoll fractionation and frozen as previously described (23, 29). Protein extracts, DNA substrates and DNA repair assays were performed as previously described (24, 25, 30, 31). The outline of the DNA repair assays is described in FIG. 1.

The DNA repair assays are based on DNA repair nicking assays, in which DNA repair enzymes present in protein extract nick a DNA substrate that contains a site-specific lesion. This converts the full-length substrate into a defined shorter oligonucleotide, and the ratio between the two represents the DNA repair activity. Protein extracts were prepared by a freeze-thaw protocol, from frozen PBMC that were isolated from blood samples by Ficoll fractionation. Protein concentration was determined using the BCA assay. DNA substrates were synthetic double-stranded DNA oligonucleotides, each carrying a site-specific DNA damage, which is a substrate for the DNA repair enzyme being assayed: 8-oxoguanine for OGG1, hypoxanthine for MPG, and a furanyl abasic site for APE1. Each substrate DNA was 3'-tagged with a Yakima Yellow fluorophore (see FIG. 1 for experimental outline of the panel of DNA repair assays). The enzyme activities of OGG1 and MPG were determined by following the elimination of the damaged base from the DNA, which yielded an abasic site that was further cleaved by the APE1 activity in the extract. Complete cleavage was ensured by treatment with NaOH. APE1 activity was measured by nicking of the substrate at the synthetic abasic site. All assays were conducted using the optimized reaction conditions previously published (50-53), except the APE1 assay, which we revised in this study by reducing the substrate concentration from 40 to 20 nM, and shortening reaction time from 15 to 10 minutes. All assays are based on the nicking of the substrate DNA, representing the DNA repair activity. This converts the full-length substrate into a defined shorter oligonucleotide, and the ratio between the two represents the DNA repair activity. The assays were performed on a robotic platform (Tecan Freedom EVO 200), and the reaction products analyzed by capillary gel electrophoresis, using the ABI3130XL genetic analyzer (Applied Biosystems), and the GeneMapper (Applied Biosystems) and PeakAnalyzer (Robiotec, Rehovot, Israel) software.

Bronchial and Nasal Sample Collection

Bronchial brushings. During diagnostic bronchoscopy procedures three bronchial brushings, designed to gently remove epithelial cells with minimal bleeding, were performed using bronchial brushes (Olympus Medical, Southend, UK). Brushings using disposable cytology brushes (BC-202D-5010 Olympus Japan) were taken from geographically different areas of macroscopically uninvolved main bronchus or lobar bronchi contralateral to the suspected lesion.

Nasal curette samples. Samples of nasal airway epithelium were taken under direct vision from the inferior part of the inferior turbinate of each nostril using nasal curettes (ASI Rhino-Pro; Arlington Scientific Inc.).

RNAseq

Tissue samples from bronchial brushings and nasal curettes were stored in 500 µl RNALater overnight at 4° C., and then at −80° C. for longer-term storage. RNA was extracted using Qiagen MiRNeasy columns according to manufacturer's protocols. Briefly, bronchial brushes were rinsed in PBS, brushes transferred into 700 µl Qiazol and cells lysed by vortexing twice for 30 seconds. For nasal samples the RNALater containing nasal tissue (500 µl) was diluted with 2 ml of PBS and spun at 10,000 rpm for 10 min. The cell pellet was lysed by resuspension in 700 µl Qiazol. For both types of samples, the Qiazol lysate was applied to a QiaShredder tube (#217004) and spun at 13,000 rpm for 2 mins. The homogenate was kept at room temperature for 5 mins, followed by chloroform extraction using PhaseLock tubes. Nucleic acids in the aqueous phase were precipitated using 1.5 volumes 100% ethanol and DNA was digested using DNAse I. Finally, RNA was isolated from the mixture using RNAeasy mini spin columns. RNA was quantified using a Qbit measurement and quality assessed using an Agilent Bioanalyzer. For samples with a RIN greater than 7, a total of 500 ng of RNA was used for Illumina TruSeq Library generation. Sequencing was carried on a HiSeq 2500 Illumina sequencers. Sequencing was carried out in two separate multiplexed experiments. Alignment was carried out on the human genome version GRCh37 using the Tophat alignment tool. On average each library contained above 20 Million reads. Count matrices for cases and controls were processed using DESeq2.

Analysis of RNAseq Data

The following sections describe the methods and results of quality control (QC) procedures, data cleaning and statistical analyses implemented in the Examples described herein. The RNAseq dataset included read counts from 669 nasal and bronchial samples derived from 490 subjects, out of which DNA repair score values were available for 213 subjects. The 669 samples' RNAseq dataset (sequencing batches: 494 samples in experiment 1 and 175 in experiment 2) was used in its entirety for the QC analysis.

Quality Control Analysis of the RNAseq Data

Number of detected genes. Gene transcripts were defined as detected if it had counts of more than 10 reads. Genes with <10 reads were filtered out. Samples with less than 13,000 detected genes were filtered out from the analysis. 97.8% of the samples analyzed in experiment 1 and 98.3% in experiment 2 had >13,000 detected genes.

Experimental batches. Principal Component Analysis (PCA) was used to detect the major sources of variation in the data. As expected, tissue type-nasal (NS) versus bronchial (BR), explains most of the variance followed by sequencing batches (experiment 1 versus experiment 2; FIG. 6).

Gender effect. A good quality RNAseq dataset should enable identifying gender differences in gene expression. Stratifying by sequencing batch and tissue type we observed the effect of gender in the PCA of ~100 most variable genes. Several mismatches that were found were removed from further analysis (not shown).

Final number of samples for analysis. Following data cleaning, The final number of samples that had both RNAseq expression data and DNA repair score results was 242:150 samples from lung cancer patients, including 113 nasal samples (88 from experiment 1 and 25 from experiment 2) and 37 bronchial samples (22 from experiment 1 and 15 from experiment 2), and a total of 92 nasal samples from control subjects (67 from experiment 1 and 25 from experiment 2).

Differential expression analysis: Analysis was performed on the combined dataset obtained from the two experimental batches (Experiments 1 & 2). Similar results were obtained when only the bigger dataset of Experiment 1 was used. The RNAseq data was regressed on DNA repair scores using DESeq2, a regression tool optimized for RNAseq data. Analysis was performed separately on the different tissues (nasal/bronchial) and disease state (cases/controls), with experimental batch, age, gender, smoking status (never, former and current smokers) and cancer histology (in cases) as adjusting factors. With a False Discovery Rate (FDR) threshold of 0.01, we could find very few genes whose expression correlated with the DNA repair score, as follows: case bronchial samples, 0; case nasal samples, 8; control nasal samples, 1; Nevertheless, it is notable that in the cases group (but not in control subjects) there is an enrichment of genes whose expression increases with decreasing DNA repair OMA score values (left, negative values part of the Volcano plot in FIG. 7D). Hypothesizing that the correlation signal might be distributed over many genes, with each gene having a small effect size, the present inventors employed gene set enrichment analysis (GSEA), testing for pathways enriched with genes that are correlated with the DNA repair OMA score.

Gene set enrichment analysis: The list of genes, ranked by their statistics (as reported in DESeq2) was analyzed by GSEA (GSEA 3.0) in order to identify whether there is an over-representation of genes belonging to specific pathways (annotated by Gene Ontology; GO terms; pathway Gene Ontology downloaded from MSigDB (6), c5.all.v6.1). Table 2A lists the thirty most significant pathways that were identified.

TABLE 2A

Highest GSEA differentially expressed pathways in samples from lung cancer patients

| No. | Pathway | Size* | ES[†] | NES[‡] | FDR q-val[§] |
|---|---|---|---|---|---|
| 1 | GO_POSITIVE_REGULATION_OF_IMMUNE_RESPONSE | 450 | −0.59 | −2.75 | <10<sup>−5</sup> |
| 2 | GO_ACTIVATION_OF_IMMUNE_RESPONSE | 340 | −0.60 | −2.73 | <10<sup>−5</sup> |
| 3 | GO_CYTOKINE_MEDIATED_SIGNALING_PATHWAY | 344 | −0.59 | −2.72 | <10<sup>−5</sup> |
| 4 | GO_ACTIVATION_OF_INNATE_IMMUNE_RESPONSE | 180 | −0.62 | −2.68 | <10<sup>−5</sup> |
| 5 | GO_REGULATION_OF_INNATE_IMMUNE_RESPONSE | 300 | −0.59 | −2.67 | <10<sup>−5</sup> |

TABLE 2A-continued

Highest GSEA differentially expressed pathways in samples from lung cancer patients

| No. | Pathway | Size* | ES† | NES‡ | FDR q-val§ |
|---|---|---|---|---|---|
| 6 | GO_POSITIVE_REGULATION_OF_DEFENSE_RESPONSE | 296 | −0.58 | −2.65 | <10⁻⁵ |
| 7 | GO_POSITIVE_REGULATION_OF_INNATE_IMMUNE_RESPONSE | 216 | −0.60 | −2.65 | <10⁻⁵ |
| 8 | GO_ANTIGEN_PROCESSING_AND_PRESENTATION_OF_EXOGENOUS_PEPTIDE_ANTIGEN_VIA_MHC_CLASS_I | 60 | −0.71 | −2.65 | <10⁻⁵ |
| 9 | GO_INFLAMMATORY_RESPONSE | 336 | −0.57 | −2.64 | <10⁻⁵ |
| 10 | GO_IMMUNE_RESPONSE_REGULATING_CELL_SURFACE_RECEPTOR_SIGNALING_PATHWAY | 256 | −0.59 | −2.63 | <10⁻⁵ |
| 11 | GO_ANTIGEN_RECEPTOR_MEDIATED_SIGNALING_PATHWAY | 153 | −0.61 | −2.62 | <10⁻⁵ |
| 12 | GO_ANAPHASE_PROMOTING_COMPLEX_DEPENDENT_CATABOLIC_PROCESS | 72 | −0.67 | −2.60 | <10⁻⁵ |
| 13 | GO_CELLULAR_RESPONSE_TO_CYTOKINE_STIMULUS | 473 | −0.55 | −2.57 | <10⁻⁵ |
| 14 | GO_GRANULOCYTE_MIGRATION | 50 | −0.71 | −2.57 | <10⁻⁵ |
| 15 | GO_RESPONSE_TO_INTERFERON_GAMMA | 111 | −0.63 | −2.56 | <10⁻⁵ |
| 16 | GO_INNATE_IMMUNE_RESPONSE | 437 | −0.55 | −2.56 | <10⁻⁵ |
| 17 | GO_LEUKOCYTE_CHEMOTAXIS | 87 | −0.64 | 2.54 | <10⁻⁵ |
| 18 | GO_CELL_CHEMOTAXIS | 128 | −0.60 | −2.52 | <10⁻⁵ |
| 19 | GO_INNATE_IMMUNE_RESPONSE_ACTIVATING_CELL_SURFACE_RECEPTOR_SIGNALING_PATHWAY | 94 | −0.63 | 2.52 | <10⁻⁵ |
| 20 | GO_TUMOR_NECROSIS_FACTOR_MEDIATED_SIGNALING_PATHWAY | 99 | −0.63 | −2.52 | <10⁻⁵ |
| 21 | GO_IMMUNE_EFFECTOR_PROCESS | 374 | −0.54 | −2.51 | <10⁻⁵ |
| 22 | GO_DEFENSE_RESPONSE_TO_BACTERIUM | 124 | −0.60 | −2.51 | <10⁻⁵ |
| 23 | GO_T_CELL_RECEPTOR_SIGNALING_PATHWAY | 126 | −0.61 | −2.51 | <10⁻⁵ |
| 24 | GO_ADAPTIVE_IMMUNE_RESPONSE | 193 | −0.57 | −2.51 | <10⁻⁵ |
| 25 | GO_LEUKOCYTE_MEDIATED_IMMUNITY | 129 | −0.60 | −2.49 | <10⁻⁵ |
| 26 | GO_REGULATION_OF_LEUKOCYTE_MEDIATED_IMMUNITY | 131 | −0.59 | −2.49 | <10⁻⁵ |
| 27 | GO_CELLULAR_RESPONSE_TO_INTERFERON_GAMMA | 93 | −0.62 | −2.48 | <10⁻⁵ |
| 28 | GO_POSITIVE_REGULATION_OF_IMMUNE_EFFECTOR_PROCESS | 129 | −0.59 | −2.48 | <10⁻⁵ |
| 29 | GO_MYELOID_LEUKOCYTE_MIGRATION | 70 | −0.64 | −2.47 | <10⁻⁵ |
| 30 | GO_PATTERN_RECOGNITION_RECEPTOR_SIGNALING_PATHWAY | 96 | −0.61 | 2.45 | <10⁻⁵ |

*Number of genes in the pathway
†Enrichment Score
‡Normalized enrichment score
§False DiscoveryRate q-value For each pathway, the enrichment algorithm finds the maximum enrichment score, reflecting the degree to which the genes in the set are over-represented at either the top (positive correlation) or bottom (negative correlation) of the list, and calculates the FDR q-value (the false discovery rate), which is the estimated probability that the enrichment score represents a false positive finding. The pathways were manually curated and divided into 3 groups: Immune system-related pathways, Cell Cycle pathways and Other pathways. Table 2B summarize the pathways that were found to be significantly enriched in nasal samples by GSEA (q-value<0.001, showing a strong negative association of Immune system-related pathways in the cases group, with essentially no signal in the control groups (see also FIG. 5).

TABLE 2B

Summary of biological pathways enrichment in nasal cells obtained for the DNA repair score using GSEA

| Subjects class | Direction of correlation | Number of pathways reported by GSEA | Number of Biological pathways* with P value <0.001 | | | |
|---|---|---|---|---|---|---|
| | | | All | Immune system* | Cell cycle* | Other |
| Case | Negative | 3564 | 305 | †185 | 23 | 97 |
| Control | Negative | 2638 | 92 | 1 | 40 | 51 |
| Case | Positive | 532 | 0 | 0 | 0 | 0 |
| Control | Positive | 1458 | 0 | 0 | 0 | 0 |

*Immune related pathways were selected based on the following keywords: IMMUNE, IMMUNITY, CHEMOTAXIS, CHEMOKINE, TUMOR_NECROSIS, B_CELL, T_CELL, LEUKOCYTE, GRANULOCYTE, LYMPHOCYTE, INTERFERON, ANTIGEN, DEFENSE, CYTOKINE, INFLAMM, MYELOID, FC_#RECEPTOR, MHC_#, KAPPAB, INTERLEUKIN, TOLL_LIKE_RECEPTOR, RESPONSE_TO_#VIRUS, MACROPHAGE, WOUND, PHAGO, NEUTROPHIL, RESPONSE_TO_#BACTERI, RESPONSE_TO_#FUNGUS; According to these keywords 366 out of the 4096 pathways reported by GSEA were defined as Immune related pathways.

Another set of pathways that exhibited negative correlation with the OMA score represents cell cycle pathways, which unlike the Immune system-related pathways seem to be enriched in both cases and controls (Table 2B).

To visualize the differences in the correlations between DNA repair score and immune-system pathways, versus DNA repair score and 'Other' pathways, the present inventors highlight in differential expression volcano plots two pathways, selected for being relative big and with roughly similar size (~350 genes): the inflammatory response pathway (GO_INFLAMMATORY_RESPONSE, which is an immune system pathway), and the skeletal system development pathway (GO_SKELETAL_SYSTEM_DEVELOPMENT, which belongs to 'Other pathways'. FIGS. 7A-I shows Volcano plots, for all the available groups (Cases/Controls)×(Nasal/Bronchial) (in grey dots; FIGS. 7A, 7D, 7G), highlighting the inflammatory response pathway (in red dots; FIGS. 7B, 7E, 7H) compared to the skeletal system development pathway (in blue dots; FIGS. 7C, 7F, 7I). The inflammatory response pathway was found to be enriched in the cases both in nasal and in bronchial tissues (left Volcano lobe, FIGS. 7E, 7H), but not in the controls (FIG. 7B). The skeletal system development pathway was not enriched in any group/tissue (FIG. 7C, 7F, 7I).

Simulations to Test the Robustness of the Correlation Between a Low DNA Repair OMA Score and Activity of Immune System Pathways Extreme OMA score trimming analysis. The analysis for the nasal tissue samples sequenced in experiment 1 was repeated, except that samples with OMA scores at the tails of the OMA distribution were excluded, removing 3.5% tail from each side of the OMA scores.

The effect of extreme trimming is presented in FIG. 8A, showing the upregulation of the immune pathways also with the trimmed OMA score (compared to FIG. 5).

Sub-sampling analysis. To get an estimate for the robustness of the results to a more general sampling noise, 100 iterations of random sub-sampling of subjects were performed and the regression in each iteration was repeated. The RNAseq data of the selected random groups of subjects (at 80% of the sample size) were regressed on OMA scores, followed by gene set enrichment analysis, and the number of significant immune system-related pathways (at a q-value<0.001) was determined. FIG. 8B shows that 95% of the simulations have more than 117 significant immune system-related pathways (with median value of 137). This analysis is an indication that the results are not sensitive to sampling noise.

Methods and Tools for RNAseq analysis: All Statistical analysis was conducted in R version 3.2.1. All figures were generated with ggplot2 package. Data normalization and regression analysis was done with DESeq2. GSEA and MSigDB (c5.all.v6.1) were used for GO enrichment.

Calculation of 5-year risk of lung cancer: The basis of the calculation was the Liverpool Lung Project (LLP) risk model (54). To illustrate the effect of the DNA repair score (OMA score) on the risk of lung cancer the following was carried out: (a) The profile of a male or female aged 65 y who had one of the following smoking histories was selected: never smoked, smoked for 10 years, smoked for 30 years or smoked for 50 years, and who had none of the other risk factors in the LP model (i.e. no prior diagnosis of pneumonia, no occupational exposure to asbestos, no prior diagnosis of a malignant tumor and no family history of lung cancer). (b) It was assumed that the distribution of OMA DNA repair scores was independent of the risk factors in the LLP model. This is supported by data from the current and previous studies that have shown that the OMA score has small statistically non-significant correlations with age, sex and smoking history. (c) It was assumed also that none of the risk factors in the LLP model modify the effect of OMA score on lung cancer risk. This is also supported by data from the current and previous studies that have shown small statistically non-significant interactions between OMA and age, sex and smoking history. (d) Under these assumptions, the LLP model was adapted to include the OMA score as an extra factor. The beta-coefficient for the OMA score in this model was log (2.5), where 2.5 was the cross-validated odds ratio estimate for the DNA repair score (see Table 5 herein below). For a 65-year old male with the above-mentioned profile, the modified model was:

$$\text{logit}(P) = -5.56 + \text{beta-smok} - \log(2.5) \times (\text{OMA} - 3.553). \quad (1)$$

In this equation, P is the probability of lung cancer diagnosis within the next 5 years, the value of −5.56 is taken from Table A1 of (54), the value of beta-smok is 0, 0.769, 1.452 or 2.507 respectively for never-smoked, or smoked for 10 y, 30 y or 50 y (taken from Table 2 of (54)), and the value of 3.553 was calculated by us so as to yield an average risk in our control group equal to the average risk in the Liverpool population of males aged 65 y in the years 2002-4 (see Table A1 of (54)).

The model for a 65-year old female was that given in Equation (A1) except that −5.56 was replaced by −5.99 (see Table A1 (54)) and 3.553 was replaced by 3.555 (present calculation). (e) Equation (1) enables the 5-year lung cancer risk to be calculated for a person resident in Liverpool with one of our profiles and a specific value of the OMA score (to be entered into the equation). To calculate the average risk for persons with that same profile but with OMA scores below or above a given percentile ($5^{th}$, $10^{th}$ or $75^{th}$, as given in Table 3), numerical integration was used over the distribution of OMA scores, assuming the DNA repair score had a normal distribution with mean value of 4.00 (see the control group mean in Table 1, herein above) and standard deviation 0.98 (the control group's SD).

TABLE 3

Estimated projected 5-year risk of lung cancer for persons aged 65 y with different smoking histories and different DNA repair scores

| Gender | Duration of smoking | Average 5-year risk to develop lung cancer (%)* | 5-year risk to develop lung cancer (%) for different DNA repair OMA scores† | | |
|---|---|---|---|---|---|
| | | | ≤5th percentile | ≤$10^{th}$ percentile | ≤$75^{th}$ percentile |
| Male | Never | 0.4 | 1.7 | 1.3 | 0.1 |
| | 10 y | 0.8 | 3.6 | 2.8 | 0.2 |
| | 30 y | 1.6 | 6.9 | 5.4 | 0.4 |
| | 50 y | 4.5 | 17.2 | 13.8 | 1.1 |
| Female | Never | 0.2 | 1.1 | 0.9 | 0.1 |
| | 10 y | 0.5 | 2.4 | 1.8 | 0.1 |
| | 30 y | 1.1 | 4.6 | 3.6 | 0.2 |
| | 50 y | 3.0 | 12.0 | 9.5 | 0.7 |

Statistical Analysis

Personal characteristic of cases and controls were compared using unpaired t-tests for continuous variables and chi-squared tests for categorical variables. The smoking status distribution differed between cases and controls, with approximately 30% of the controls being never smokers compared to only one case. In addition, while cases and controls were quite well-matched by gender, the controls were approximately nine years younger than the cases on average. Therefore all comparisons of cases and controls were adjusted for smoking and age, as well as gender. The adjustment was performed by using regression models in which these factors were included as covariates. Because of the large imbalance in the smoking variable, these regression analyses essentially compare the 98 ever-smoked controls with the 149 ever-smoked cases, and very little information is gained from the never-smokers. Indeed, in additional analyses where we excluded the never-smokers, the regression results were virtually unchanged from those reported below in the Results section. COPD was reported more commonly among the lung cancer cases than among the controls; no adjustment for COPD was made in our analyses, as it is likely a mediating factor rather than a confounder in the association of DNA repair enzymes with lung cancer, and adjusting for mediating factors is not recommended (32).

The association of DNA enzyme repair levels with lung cancer risk was evaluated using unconditional logistic regression model in which the presence or absence of lung cancer was the binary dependent variable, and the covariates were the DNA repair enzyme levels (OGG1, MPG and APE1) together with age (continuous), sex and smoking status (smoker, past smoker, never smoker) as adjusting variables. From this model the DNA repair scores were derived using the estimated regression coefficients for the OGG1, MPG and APE1 variables. The resulting formula of the DNA repair score for each study participant was: DNA repair score=0.00621×APE1−0.0047×OGG1−0.0223× MPG. Examination of the scores for cases and controls showed them to be approximately normally distributed within each group. This score was then entered as a covariate in a new logistic regression model, either as a continuous variable or in tertile categories (according to the score distribution in the control subjects), with the same adjusting variables, to obtain odds-ratio estimates and receiver-operating characteristic (ROC) curves to describe the strength of the DNA repair score-lung cancer association. To overcome the bias arising from use of the same data to develop the DNA repair score and evaluate its strength of association, the odds ratios and ROC curves were re-estimated using "leave-one-out" cross validation (33). The continuous scores were also compared with case-control status, age group ($\leq 55$, 56-69, $\geq 70$ yrs), gender, smoking status and histology and disease stage (Table 4). The P-value for statistical significance was taken to be 5%. Two-sided significance tests were used throughout.

Results

Low DNA Repair Score in Lung Cancer Patients Compared to Control Subjects in the UK To examine whether a low DNA repair score is associated with lung cancer risk in the UK a case-control study was conducted with 150 non-small cell lung cancer cases and 143 control subjects. The enzymatic activities for OGG1, MPG and APE1 in PBMC samples were analyzed in a blinded fashion. After completion of DNA repair testing, the study was unblinded, and the clinical and DNA repair data was used for the statistical analysis. From the logistic regression relating levels of OGG1, MPG and APE1 to lung cancer risk (adjusting for age, gender and smoking status), the DNA repair score, defined in the footnote to Table 4, was derived. Results of the analysis of this DNA repair score are presented in Table 4 and FIG. 2. 4

TABLE 4

Distribution of selected characteristics and DNA repair score* between non-small-cell lung cancer case patients and control subject

| Variable | Control subjects (n = 140) | | Case patients (n = 149) | |
|---|---|---|---|---|
| | No. | DNA repair score mean, (95% CI) | No. | DNA repair score mean, (95% CI) |
| All† | 140 | 4.00 (3.84 to 4.16) | 149 | 2.67 (2.50 to 2.84) |
| | | P(Case v Control)*** < 0.001 | | |
| Histology | | | | |
| SQCC | | | 56 | 2.69 (2.45 to 2.93) |
| Adenocarcinoma | | | 82 | 2.62 (2.38 to 2.86) |
| Unknown | | | 11 | 2.92 (1.87 to 3.98) |
| | | P(SQCC v Adenocarcinoma)**** = 0.65 | | |
| Age, y | | | | |
| $\leq 55$ | 43 | 4.28 (3.96 to 4.59) | 16 | 2.36 (1.82 to 2.89) |
| 56-69 | 75 | 4.00 (3.81 to 4.20) | 64 | 2.86 (2.55 to 3.16) |
| $\geq 70$ | 22 | 3.45 (2.95 to 3.94) | 69 | 2.56 (2.35 to 2.78) |
| | | P(age trend)***** = 0.075 | | |
| Gender | | | | |
| Male | 77 | 3.82 (3.59 to 4.05) | 93 | 2.71 (2.49 to 2.93) |
| Female | 63 | 4.21 (3.99 to 4.44) | 56 | 2.60 (2.32 to 2.88) |
| | | P(M v F)***** = 0.47 | | |
| Smoking status | | | | |
| Never smoked | 45 | 4.07 (3.79 to 4.36) | 1 | 4.85 |
| Past smoker | 49 | 3.98 (3.72 to 4.24) | 87 | 2.60 (2.40 to 2.81) |
| Current smoker | 46 | 3.95 (3.62 to 4.27) | 61 | 2.72 (2.43 to 3.02) |
| | | P(ever smoked v never smoked)***** = 0.32; | | |
| | | P(current smoker v. others)***** = 0.65 | | |
| COPD | | | | |
| No | 109 | 4.02 (3.85 to 4.19) | 56 | 2.86 (2.55 to 3.18) |
| Yes | 22 | 3.82 (3.30 to 4.34) | 77 | 2.57 (2.35 to 2.79) |
| | | P(Yes v No)****** = 0.13 | | |

*The DNA repair score was defined as: 0.00621 × APE1 − 0.047 × OGG1− 0.0223 × MPG, where APE1, OGG1 and MPG represent each the measured enzyme activity of an individual. The weights for each component used in the DNA repair score were calculated from the logistic regression, and chosen to optimize strength of association of the score with lung cancer for the observed data set.
**Values were missing for 3 controls (2 current and 1 past smoker) and 1 case (current smoker).
***p-value comparing the distribution of cases with controls: analysis of covariance was used adjusting the comparison for continuous age, gender and smoking status.
****p-value for comparing SQCC with Adenocarcinoma: analysis of covariance was used adjusting for case-control-status, continuous age, gender and smoking status.
*****p-values obtained from analysis of covariance for factor of interest, adjusted for case-control status and other factors from among age, sex and smoking status.
******p-value comparing COPD v no COPD; using analysis of covariance adjusting for continuous age and gender.

The mean score in patients was 2.67 (95% CI 2.50 to 2.84), and was lower than in the control subjects: 4.00 (95% CI 3.84-4.16) (P<0.001; Table 4). Consistently, the distribution of DNA repair score values among patients was shifted to lower values compared to control subjects (FIG. 2). There were no statistically significant differences between the mean scores of males and females, subjects with or without COPD, never, past and current smokers, and patients with adenocarcinoma or squamous cell carcinoma (Table 4). There appeared to be a decrease in DNA repair score with age among control subjects, but it did not reach statistical significance (Table 4).

Low DNA Repair Score is Associated with Lung Cancer

When the DNA repair score was assessed as a continuous variable in relation to lung cancer risk, a one-standard-deviation decrease in the DNA repair score was associated with an increased adjusted odds ratio of 2.7 (95% CI 1.9 to 3.7; P<0.001), and 2.5 (95% CI 1.8 to 3.4; P<0.001) after cross-validation (Table 5). When the score was categorized into tertiles, using the tertile with the highest score as reference, the adjusted odds ratio for lung cancer in the lowest tertile was 11.5 (95% CI 4.3 to 31.2; P<0.001), and 7.2 (95% CI 3.0 to 17.5; P<0.001) after cross-validation (Table 5). These results suggest that a low DNA repair score is strongly associated with lung cancer risk.

Within TNM categories, the mean DNA repair scores in lung cancer patients with T1a, N0 and M0 were 2.80 (95% CI 2.35 to 3.25), 2.90 (95% CI 2.64 to 3.17), and 2.76 (95% CI 2.58 to 2.95), respectively, each significantly lower than in control subjects (DNA repair score=4.00), with P values of 0.011, <0.0001 and <0.0001, respectively. These findings

TABLE 5

Unconditional logistic regression analysis of the DNA repair score*

| Variable | Score value | No. of control subjects (%) | No. of case patients (%) | Adjusted** OR (95% CI) | Cross-validation Adjusted** OR (95% CI) |
|---|---|---|---|---|---|
| Score per 1 SD decrease***** | 0.98 U | 140 (100.0) | 149 (100.0) | 2.7 (1.9 to 3.7) P < 0.001 | 2.5 (1.8 to 3.4) P < 0.001 |
| Score by tertiles******: | | | | | |
| Highest tertile | ≥4.52 | 47 (33.6) | 6 (4.0) | 1.0 (referent) | 1.0 (referent) |
| Middle tertile | 3.68-4.51 | 46 (32.9) | 22 (14.8) | 3.0 (1.0 to 8.7) P = 0.048 | 1.6 (0.6 to 4.2) |
| Lowest tertile | ≤3.68 | 47 (33.6) | 121 (81.2) | 11.5 (4.3 to 31.2) P < 0.001 | 7.2 (3.0 to 17.5) |

*DNA repair score definition: 0.00621 × APE1 − 0.047 × OGG1 − 0.0223 × MPG.
**OR = odds ratio.
**CI = confidence interval.
****Unconditional logistic regression adjusted for age, gender and smoking status (smoker, past smoker, never smoker).
*****Score was fitted in the unconditional logistic regression model as a continuous variable.
0.98 U is the one standard deviation in the control group for the DNA repair scores. For each model the estimated odds ratios for smoking were slightly different and the range was as follows: Current v Never: 57.1-59.4; Current v Ex: 1.27-1.29.
******Tertiles of the control subjects' values. The upper tertile was chosen as the referent.
*******Cross-validated ORs calculated according to the SDs and tertiles of the cross-validated DNA repair scores.

DNA Repair Score is Lower in Each Staging Category of Patients than in Control Subjects The DNA repair score for cases was examined within each disease stage, and each TNM category. The mean score in patients with stage 1A lung cancer was 2.95 (95% CI 2.56 to 3.35), significantly lower than the mean of control subjects (4.00, 95% CI 3.84 to 4.16) with P=0.0009, adjusted for age, sex and smoking status (FIGS. 3A-D and Table 5).

are consistent with low DNA repair score being a risk factor for lung cancer, possibly acting from the very early stages of lung carcinogenesis. The tests performed show a further small yet significant decline in the DNA repair score for more advanced disease stage, N category and M category, and there is also a non-significant decline over T categories (Table 6).

TABLE 6

Variation of the DNA repair score with disease staging*

| Lung cancer stage | | | | | | T staging | | | | | |
|---|---|---|---|---|---|---|---|---|---|---|---|
| Stage | n | mean | STD | CI_lower | CI_upper | T | n | Mean | STD | CI lower | CI upper |
| C† | 140 | 4.00 | 0.98 | 3.84 | 4.16 | C† | 140 | 4.00 | 0.98 | 3.84 | 4.16 |
| 1a | 25 | 2.95 | 0.95 | 2.56 | 3.35 | 1a | 22 | 2.80 | 1.02 | 2.35 | 3.25 |
| 1b | 20 | 3.26 | 0.97 | 2.80 | 3.71 | 1b | 17 | 2.65 | 1.050 | 2.11 | 3.19 |
| 2a | 18 | 2.58 | 1.04 | 2.06 | 3.10 | 2a | 49 | 2.84 | 1.03 | 2.54 | 3.13 |
| 2b | 9 | 2.07 | 0.71 | 1.53 | 2.61 | 2b | 19 | 2.45 | 1.05 | 1.94 | 2.95 |
| 3a | 24 | 2.76 | 0.76 | 2.44 | 3.08 | 3 | 16 | 2.32 | 0.90 | 1.84 | 2.80 |
| 3b | 8 | 2.18 | 0.86 | 1.46 | 2.90 | 4 | 24 | 2.62 | 1.32 | 2.06 | 3.15 |
| 4 | 44 | 2.44 | 1.28 | 2.06 | 2.83 | | | | | | |

| N staging | | | | | | M staging | | | | | |
|---|---|---|---|---|---|---|---|---|---|---|---|
| N | n | mean | STD | CI_lower | CI_upper | M | n | Mean | STD | CI lower | CI upper |
| C† | 140 | 4.00 | 0.98 | 3.84 | 4.16 | C† | 140 | 4.00 | 0.98 | 3.84 | 4.16 |
| 0 | 64 | 2.90 | 1.05 | 2.64 | 3.17 | 0 | 103 | 2.76 | 0.96 | 2.58 | 2.95 |
| 1 | 17 | 2.67 | 1.39 | 1.96 | 3.39 | 1a | 14 | 2.37 | 1.22 | 1.67 | 3.07 |
| 2 | 51 | 2.50 | 0.95 | 2.23 | 2.77 | 1b | 30 | 2.48 | 1.32 | 1.99 | 2.97 |
| 3 | 15 | 2.22 | 1.00 | 1.67 | 2.77 | | | | | | |

| | Cases vs. controls‡ | | | Linear regression§ | | | |
|---|---|---|---|---|---|---|---|
| | | Difference | P value | Estimate | Std. Error | t value | Pr(>|t|) |
| Stage | Nonadjusted | −1.05 | <0.0001 | −0.103 | 0.038 | −2.721 | 0.0073 |
| | Adjusted | −0.79 | 0.0009 | −0.125 | 0.039 | −3.253 | 0.0014 |

TABLE 6-continued

Variation of the DNA repair score with disease staging*

| | | | | | | | |
|---|---|---|---|---|---|---|---|
| T | Nonadjusted | −1.20 | <0.0001 | −0.065 | 0.055 | −1.173 | 0.2426 |
| | Adjusted | −0.67 | 0.011 | −0.073 | 0.055 | −1.329 | 0.1861 |
| N | Nonadjusted | −1.09 | <0.0001 | −0.215 | 0.080 | −2.700 | 0.0078 |
| | Adjusted | −0.84 | <0.0001 | −0.252 | 0.081 | −3.124 | 0.0022 |
| M | Nonadjusted | −1.24 | <0.0001 | −0.160 | 0.108 | −1.475 | 0.1425 |
| | Adjusted | −1.05 | <0.0001 | −0.227 | 0.111 | −2.047 | 0.0425 |

*DNA repair score with the revised APE1 assay.
[†]Control subjects
[‡]For disease stage—Controls vs stage 1a; for T staging—controls versus T1a; for N staging—controls vs. N0; for M staging, controls vs. M0.
[§]Test for a linear trend between staging categories in cases (control subjects not included).

Sensitivity, Specificity and ROC of DNA Repair Score Testing

Plotting the sensitivity and specificity of the DNA repair score combined with age and smoking status in ROC (receiver operating characteristic) curves yielded an AUC (area under the curve) of 0.89, and 0.88 after cross-validation (FIG. 4B). When DNA repair score was assessed separately from age and smoking, the AUC was 0.81 for the DNA repair score (0.80 after cross-validation; FIG. 4A). The AUC for age and smoking status without OMA was 0.83 (FIG. 4B). The added value of the DNA repair score in estimating lung cancer risk on top of the risk predicted based on age and smoking is illustrated by the following sensitivity values: at a specificity of 95%, the sensitivity of smoking and age as risk factors is 34%, with the DNA repair score exhibiting a similar independent sensitivity of 36%. When the two are combined, the sensitivity is increased to 54%. Similarly, at a specificity of 90%, the combined sensitivity is 64%, higher than smoking/age (43%) or DNA repair score (50%) risk factors alone.

Low DNA Repair Score Correlates with Increased Expression of Immune System Pathways in Lung Cancer Patients Having the DNA repair scores of a group of people, the present inventors sought to examine whether inter-personal variations in DNA repair correlate with systemic effects in the human body. To that end, they examined the relationship between the DNA repair score and whole transcriptome RNAseq analysis in airway epithelial cells. Analysis included 213 subjects-92 healthy control subjects and 121 lung cancer patients, selected after performing quality control procedures and data cleaning on a larger RNAseq dataset. The correlation between RNA expression levels and DNA repair score was tested separately for cases and controls, by regressing the RNA expression levels of each gene in the dataset on the DNA repair score values using the DESeq2 tool (34). Gender, age, smoking status and experimental batch were incorporated as adjusting variables. Very few genes were significantly correlated with scores at a false discovery rate (FDR) threshold of 0.01 (see Methods).

Hypothesizing that there is a signal in the data which is distributed over many genes, with small effect size in each gene, the present inventors examined whether there are pathways that are significantly enriched with varying score values, using Gene Set Enrichment Analysis (GSEA) (35). For each group (cases/controls) they ranked ~15,000 genes based on the statistics of DESeq2 and used this ranking as input to GSEA with default parameters. They tested for over-representation of genes belonging to specific pathways as defined by Gene Ontology (GO terms). Pathways identified by GSEA, were manually curated and divided into 3 groups: Immune system-related pathways, Cell Cycle pathways and Other pathways (see keywords in legend to Table 2B). The analysis revealed 185 immune response pathways that were significantly enriched, spanned by 3154 unique genes negatively correlated with the DNA repair score. Strikingly, this correlation was specific for the lung cancer patients, and was not observed in the control subjects' samples (FIG. 5, Table 2B). The dramatic enrichment in the immune response pathways was robust against sub-sampling, indicating that it is not a sampling bias (FIGS. 8A-B).

Another set of pathways that exhibited negative correlation with the DNA repair score represents cell cycle pathways (Table 2B). This correlation was found both in lung cancer patients and control subjects, with a larger number of pathways enriched in the control subjects. RNAseq analysis of 37 bronchial samples, which were obtained only from cases, also showed an enrichment of immune-system related pathways (FIG. 5). In conclusion, the expression data suggest that low DNA repair score correlates with broad up-regulation of immune response pathways in lung cancer patients, but not in control subjects.

Example 2

Analysis of Additional DNA Repair Enzymes

The outline of the experimental plan is shown in FIG. 10. Sixty patients with stage IV non-small cell lung cancer, who have a PD-L1 ≥50%, and planned for treatment with immune checkpoint inhibitors, will be recruited to the study. This choice of high PD-L1 was made to allow enough statistical power for a relatively modest size group, and based on the reports that PD-L1 levels and TMB are independent biomarkers. Each study participant will contribute a blood sample prior to treatment. The blood sample will be used to test for the panel of six DNA repair enzyme activities: OGG1, MPG, APE1, TDG, SMUG1 and NEIL1, directed to oxidative and alkylation DNA damage (see FIG. 11 for results with the three additional assays NEIL1, SMUG1 and TFG). DNA repair activities will be tested both in PBMC and in expanded T cells. Three months after treatment, a sub-group of 20 participants will provide an additional blood sample, and DNA repair will be tested again. Full follow-up will be performed at 6- and 12-months after treatment start, and correlation between DNA repair and treatment outcome will be determined. In addition the suitability of DNA repair measured in each of the two cell types (i.e. PBMC and expanded T cells) will be evaluated for predicting response to immunotherapy. The effect of immunotherapy on DNA repair activities, and the correlation between TMB and DNA repair will be examined in a subgroup of 10-20 patients. All six activities will be determined using the same extract, in 6 different reactions, each under condition optimized for the enzyme assayed. The substrate for each assay is a fluorescently-tagged synthetic oligonucleotide carrying a site-specific defined damaged base, which is the substrate for the tested DNA repair enzyme. Repair of the damage is followed using the ABI3130XL genetic analyzer. The assays will be run in a robotic platform.

Tumor mutation burden: This will be performed using commercial analysis (e.g., Foundation One).

Statistical analysis. The proposed study has a 77% and 94% power to detect 40% and 50% increase response to immunotherapy, respectively, in patients with low DNA repair, at the 5% level (two-sided t-test). Performance of the DNA repair tests as predictors of the response to immunotherapy will be calculated by different statistical tests including Kaplan-Meier as appropriate. Multivariate analysis will be performed for testing combinations of DNA repair activities. Paired t-test will be used to assess differences between DNA repair activities before and after treatment. Pearson correlation coefficient will be used to evaluate the correlation between DNA repair activities in resting PBMC and proliferating T cells, and between DNA repair activities and TMB.

Anticipated results. About half of Stage 4 NSCLC patients with high (>50%) PD-L1 expression, are expected to respond to immunotherapy, namely 30 patients. Based on previous data with three (out of six) DNA repair biomarkers, the sensitivity is 43% for a cut-off value of 10%, and likely to be higher due the three additional tests. It is expected to have at least 24 patients with low DNA repair. The present study is highly powered to detect a minimal 50% increase in response to immunotherapy (18 responders out of the 24 low-repair patients, however, the effect might be bigger.

Example 3

Performance of the DNA Repair OMA Score as a Predictor of the Response of Lung Cancer Patients to Immunotherapy The following study was initiated to determine whether a low DNA repair score can serve as a biomarker for response of lung cancer patients to immunotherapy.

Method

Blood from lung cancer patients was obtained, PBMC were isolated on Ficoll, and cryopreserved in liquid nitrogen. T cells were expanded from the cryopreserved PBMC, and used to prepare protein extracts. DNA Repair enzymatic activity was measured in the extracts, from which the DNA Repair OMA score was calculated for each patient based on his/her OGG1, MPG and APE1 activity levels.

Patients and Treatment

The clinical characteristics of the patients are shown in Table 7, herein below.

TABLE 7

| WIS ID | Age | Sex | Disease stage | Time Dx[1] to IO[2] | Duration of IO[2] | Immunotherapy | Other treatm | Time alive from Dx |
|---|---|---|---|---|---|---|---|---|
| LI5001 | 61 | F | IV | 2 w[3] | 15 m & on[5] | keytruda | Chem[6] | 17 m & on |
| LI5002 | 54 | M | IV(C)[10] | 3 w | 14 m & on | keytruda | | 16 m & on |
| LI5004 | 72 | F | IIIA(C) | 8 w | 12 m & on | keytruda | | 14 m & on |
| LI5005 | 67 | M | IV(C) | 7 m[4] | 11 m | Keytruda | Chemo, Avastin[7] | 28 m & on |
| LI5006 | 64 | M | IIIA(C) | 4 m | 13.5 m & on | Durvalumab | Chemo, Radiat[8] | 18 m & on |
| LI5007 | 70 | M | IVA(C) | 6 w | 3.5 m | keytruda | | 6.5 m |
| LI5009 | 73 | M | IVB(C) | 4 w | 3 w | keytruda | | 2 m |
| LI5011 | 80 | F | IVA(C) | 5 w | 9 m & on | keytruda | Radiat[9] | 11 m & on |
| LI5012 | 72 | F | IIIA(C) | 8 w | 5.5 & on | keytruda | | 8 m & on |

[1]Dx, diagnosis
[2]IO, immunotherapy.
[3]w, week
[4]m, months
[5]& on, and continuing
[6]Treated with Chemo after there was no response to IO.
[7]IO was given as second line, and patient did not respond.
[8]Chemo and radiation were given before IO.
[9]Treated with radiation because there was no benefit from IO.
[10](C), stage determined based on clinical parameters.

Results

Relation Between DNA Repair OMA Score and Response to Immunotherapy

Table 8 shows the DNA Repair OMA score results for the patients, obtained before obtaining the/15 clinical data. The cut-off value of the DNA Repair OMA score was set to ≤2.0.

4 patients had low OMA (≤2.0)—3 responded (5002, 5004, 5012)

1 did not respond (5009).

5 patients had high OMA (>2.0)—4 did not respond (5001, 5005, 5007, 5011);

1 inconclusive (5006).

TABLE 8

| Patient No. | OMA score | Low/High Cutoff > 2 | Expected response to immunotherapy | Actual Response to immunotherapy | Prediction succeeded? |
|---|---|---|---|---|---|
| 5001 | 3.0 | High | No | NO | YES |
| 5002 | 1.7 | Low | Yes | YES | YES |
| 5004 | 1.5 | Low | Yes | YES | YES |
| 5005 | 3.6 | High | No | NO | YES |
| 5006 | 2.8 | High | No | Partial | Inconclusive |
| 5007 | 2.2 | High | No | NO | YES |
| 5009 | 1.9 | Low | Yes | NO | NO |
| 5011 | 3.0 | High | No | NO | YES |
| 5012 | 2.0 | Low | Yes | YES | YES |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

1. Torre L A, Siegel R L, Jemal A. Lung Cancer Statistics. In: Ahmad A, Gadgeel S, editors. Lung Cancer and Personalized Medicine Current Knowledge and Therapies 2016. p. 1-19.
2. National Cancer Institute NIoHU. SEER Cancer Statistics Review, 1975-2011, updated 2014 Lung and bronchus. seercancergov/archive/csr/1975_2011/results_merged/sect_15_lung_bronchuspdf. 2014.
3. Ferlay J, Colombet M, Soerjomataram I, Dyba T, Randi G, Bettio M, Gavin A, Visser O, Bray F. Cancer incidence and mortality patterns in Europe: Estimates for 40 countries and 25 major cancers in 2018. Eur J Cancer. 2018. Epub 2018 Aug. 14. doi: 10.1016/j.ejca.2018.07.005. PubMed PMID: 30100160.
4. National Cancer Institute NIoHU. SEER Cancer Statistics Review, 1975-2011, updated 2014. seercancergov/archive/csr/1975_2011/#contents. 2014.
5. D'Amelio A M, Jr., Cassidy A, Asomaning K, Raji O Y, Duffy S W, Field J K, Spitz M R, Christiani D, Etzel C J. Comparison of discriminatory power and accuracy of three lung cancer risk models. Br J Cancer. 2010; 103 (3): 423-9. Epub 2010 Jul. 1. doi: 10.1038/sj.bjc.6605759. PubMed PMID: 20588271; PMCID: 2920015.
6. Schmidt-Hansen M, Berendse S, Hamilton W, Baldwin D R. Lung cancer in symptomatic patients presenting in primary care: a systematic review of risk prediction tools. Br J Gen Pract. 2017; 67 (659): e396-e404. Epub 2017 May 10: doi: 10.3399/bjgp17X690917. PubMed PMID: 28483820; PMCID: PMC5442955.
7. Marcus M W, Raji O Y, Field J K. Lung cancer screening: identifying the high risk cohort. J Thorac Dis. 2015; 7 (Suppl 2): S156-62. Epub 2015 May 20. doi: 10.3978/j.issn.2072-1439.2015.04.19. PubMed PMID: 25984362; PMCID: PMC4419032.
8. Li K, Husing A, Sookthai D, Bergmann M, Boeing H, Becker N, Kaaks R. Selecting High-Risk Individuals for Lung Cancer Screening: A Prospective Evaluation of Existing Risk Models and Eligibility Criteria in the German EPIC Cohort. Cancer Prev Res (Phila). 2015; 8 (9): 777-85. Epub 2015 Jun. 17. doi: 10.1158/1940-6207.CAPR-14-0424. PubMed PMID: 26076698.
9. Katki H A, Kovalchik S A, Petito L C, Cheung L C, Jacobs E, Jemal A, Berg C D, Chaturvedi A K. Implications of Nine Risk Prediction Models for Selecting Ever-Smokers for Computed Tomography Lung Cancer Screening. Ann Intern Med. 2018; 169 (1): 10-9. Epub 2018 May 26. doi: 10.7326/M17-2701. PubMed PMID: 29800127.
10. Aberle D R, Adams A M, Berg C D, Black W C, Clapp J D, Fagerstrom R M, Gareen I F, Gatsonis C, Marcus P M, Sicks J D. Reduced lung-cancer mortality with low-dose computed tomographic screening. N Engl J Med. 2011; 365 (5): 395-409. Epub 2011 Jul. 1. doi: 10.1056/NEJMoa1102873. PubMed PMID: 21714641.
11. de Koning H, Van Der Aalst C, Haaf T, Oudkerk M. Effect of volume C T lung cancer screening: Mortality results of the NELSON randomised-controlled population-based trial. IASLC 19th World Conference on Lung Cancer. 2018; Abstract PL02.05.
12. Investigators. IELCAP, Henschke C I, Yankelevitz D F, Libby D M, Pasmantier M W, Smith J P, Miettinen O S. Survival of patients with stage I lung cancer detected on C T scanning. N Engl J Med. 2006; 355 (17): 1763-71.
13. Pinsky P F, Berg C D. Applying the National Lung Screening Trial eligibility criteria to the U S population: what percent of the population and of incident lung cancers would be covered? J Med Screen. 2012; 19 (3): 154-6. Epub 2012 Oct. 13. doi: 10.1258/jms.2012.012010. PubMed PMID: 23060474.
14. Vogelstein B, Kinzler K W. Cancer genes and the pathways they control. Nature Med. 2004; 10 (8): 789-99.
15. Hanahan D, Weinberg R A. Hallmarks of cancer: the next generation. Cell. 2011; 144 (5): 646-74. Epub 2011 Mar. 8. doi: 10.1016/j.cell.2011.02.013. PubMed PMID: 21376230.
16. Friedberg E C, Walker G C, Siede W, Wood R D, Schultz R A, Ellenberger T. DNA Repair and Mutagenesis. 2nd edition ed. Washington D C: ASM Press; 2006.
17. Modrich P. Mismatch repair, genetic stability, and cancer. Science. 1994; 266:1959-60.
18. Marteijn J A, Lans H, Vermeulen W, Hoeijmakers J H. Understanding nucleotide excision repair and its roles in cancer and ageing. Nat Rev Mol Cell Biol. 2014; 15 (7): 465-81. doi: 10.1038/nrm3822. PubMed PMID: 24954209.
19. Welcsh P L, King M C. BRCA1 and BRCA2 and the genetics of breast and ovarian cancer. Hum Mol Genet. 2001; 10 (7): 705-13. Epub 2001 Mar. 21. PubMed PMID: 11257103.
20. Wei Q, Cheng L, Amos C I, Wang L-E, Guo Z, Hong W K, Spitz M R. Repair of tobacco carcinogen-induced DNA adducts and lung cancer risk: a molecular epidemiologic study. J Natl Cancer Inst. 2000; 92 (21): 1764-72.
21. Sakiyama T, Kohno T, Mimaki S, Ohta T, Yanagitani N, Sobue T, Kunitoh H, Saito R, Shimizu K, Hirama C, Kimura J, Maeno G, Hirose H, Eguchi T, Saito D, Ohki M, Yokota J. Association of amino acid substitution polymorphism in DNA repair genes TP53, POLI, REV1 and LIG4 with lung cancer risk. Int J Cancer. 2005; 114 (5): 730-7.
22. Bau D T, Mau Y C, Ding S L, Wu P E, Shen C Y. DNA double-strand break repair capacity and risk of breast cancer. Carcinogenesis. 2007; 28 (8): 1726-30. Epub 2007 May 12. doi: 10.1093/carcin/bgm109. PubMed PMID: 17494053.
23. Paz-Elizur T, Krupsky M, Blumenstein S, Elinger D, Schechtman E, Livneh Z. Reduced DNA repair activity for oxidative damage and the risk of lung cancer. J Natl Cancer Inst. 2003; 95 (17): 1312-9.
24. Leitner-Dagan Y, Sevilya Z, Pinchev M, Kremer R, Elinger D, Rennert H S, Schechtman E, Freedman L, Rennert G, Livneh Z, Paz-Elizur T. Enzymatic MPG DNA repair assays for two different oxidative DNA lesions reveal associations with increased lung cancer risk. Carcinogenesis. 2014; 35 (12): 2763-70. doi: 10.1093/carcin/bgu214. PubMed PMID: 25355292; PMCID: 4303808.

25. Sevilya Z, Leitner-Dagan Y, Pinchev M, Kremer R, Elinger D, Rennert H S, Schechtman E, Freedman L, Rennert G, Paz-Elizur T, Livneh Z. Low integrated DNA repair score and lung cancer risk. Cancer Prev Res. 2014; 7:398-406.
26. Paz-Elizur T, Ben-Yosef R, Elinger D, Vexler A, Krupsky M, Berrebi A, Shani A, Schechtman E, Freedman L, Livneh Z. Reduced repair of the oxidative 8-oxoguanine DNA damage and the risk of head and neck cancer. Cancer Res. 2006; 66 (24): 11683-9.
27. Paz-Elizur T, Elinger D, Blumenstein S, Krupsky M, Schechtman E, Livneh Z. Novel molecular targets for risk identification: DNA repair enzyme activities. Cancer Biomarkers. 2007; 3:129-33.
28. Goldstraw P, Crowley J, Chansky K, Giroux D J, Groome P A, Rami-Porta R, Postmus P E, Rusch V, Sobin L, International Association for the Study of Lung Cancer International Staging C, Participating I. The IASLC Lung Cancer Staging Project: proposals for the revision of the TNM stage groupings in the forthcoming (seventh) edition of the TNM Classification of malignant tumours. J Thorac Oncol. 2007; 2 (8): 706-14. Epub 2007 Sep. 1. doi: 10.1097/JTO.0b013e31812f3c1a. PubMed PMID: 17762336.
29. Paz-Elizur T, Elinger D, Leitner-Dagan Y, Blumenstein S, Krupsky M, Berrebi A, Schechtman E, Livneh Z. Development of an enzymatic DNA repair assay for molecular epidemiology studies: Distribution of OGG activity in healthy individuals. DNA Repair. 2007; 6:45-60.
30. Sevilya Z, Leitner-Dagan Y, Pinchev M, Kremer R, Elinger D, Lejbkowicz F, Rennert H S, Freedman L S, Rennert G, Paz-Elizur T, Livneh Z. Development of APE1 enzymatic DNA repair assays: low APE1 activity is associated with increase lung cancer risk. Carcinogenesis. 2015; 36 (9): 982-91. doi: 10.1093/carcin/bgv082. PubMed PMID: 26045303; PMCID: PMC4552243.
31. Leitner-Dagan Y, Sevilya Z, Pinchev M, Kramer R, Elinger D, Roisman L C, Rennert H S, Schechtman E, Freedman L, Rennert G, Livneh Z, Paz-Elizur T. N-Methylpurine DNA Glycosylase and OGG1 DNA Repair Activities: Opposite Associations With Lung Cancer Risk. J Natl Cancer Inst. 2012; 104 (22): 1765-9. Epub 2012 Oct. 30. doi: 10.1093/jnci/djs445. PubMed PMID: 23104324; PMCID: 3502197.
32. Wang T, Li H, Su P, Yu Y, Sun X, Liu Y, Yuan Z, Xue F. Sensitivity analysis for mistakenly adjusting for mediators in estimating total effect in observational studies. BMJ Open. 2017; 7 (11): e015640. Epub 2017 Nov. 23. doi: 10.1136/bmjopen-2016-015640. PubMed PMID: 29162569; PMCID: PMC5719285.
33. Geisser S. Predictive Inference. New York, N Y: Chapman and Hall; 1993.
34. Love M I, Huber W, Anders S. Moderated estimation of fold change and dispersion for RNA-seq data with DESeq2. Genome Biol. 2014; 15 (12): 550. Epub 2014 Dec. 18. doi: 10.1186/s13059-014-0550-8. PubMed PMID: 25516281; PMCID: PMC4302049.
35. Subramanian A, Tamayo P, Mootha V K, Mukherjee S, Ebert B L, Gillette M A, Paulovich A, Pomeroy S L, Golub T R, Lander E S, Mesirov J P. Gene set enrichment analysis: a knowledge-based approach for interpreting genome-wide expression profiles. Proc Natl Acad Sci USA. 2005; 102 (43): 15545-50. Epub 2005 Oct. 4. doi: 10.1073/pnas.0506580102. PubMed PMID: 16199517; PMCID: PMC1239896.
36. Paz-Elizur T, Sevilya Z, Leitner-Dagan Y, Elinger D, Roisman L C, Livneh Z. DNA repair of oxidative damage in human carcinogenesis: potential application for cancer risk assessment and prevention. Cancer Lett. 2008; 266 (1): 60-72.
37. Cassidy A, Myles J P, van Tongeren M, Page R D, Liloglou T, Duffy S W, Field J K. The LLP risk model: an individual risk prediction model for lung cancer. Br J Cancer. 2008; 98 (2): 270-6. doi: 10.1038/sj.bjc.6604158; PMCID: PMC2361453.
38. Rizvi N A, Hellmann M D, Snyder A, Kvistborg P, Makarov V, Havel J J, Lee W, Yuan J, Wong P, Ho T S, Miller M L, Rekhtman N, Moreira A L, Ibrahim F, Bruggeman C, Gasmi B, Zappasodi R, Maeda Y, Sander C, Garon E B, Merghoub T, Wolchok J D, Schumacher T N, Chan T A. Cancer immunology. Mutational landscape determines sensitivity to PD-1 blockade in non-small cell lung cancer. Science. 2015; 348 (6230): 124-8. Epub 2015 Mar. 15. doi: 10.1126/science.aaa1348. PubMed PMID: 25765070; PMCID: PMC4993154.
39. Gubin M M, Zhang X, Schuster H, Caron E, Ward J P, Noguchi T, Ivanova Y, Hundal J, Arthur C D, Krebber W J, Mulder G E, Toebes M, Vesely M D, Lam S S, Korman A J, Allison J P, Freeman G J, Sharpe A H, Pearce E L, Schumacher T N, Aebersold R, Rammensee H G, Melief C J, Mardis E R, Gillanders W E, Artyomov M N, Schreiber R D. Checkpoint blockade cancer immunotherapy targets tumour-specific mutant antigens. Nature. 2014; 515 (7528): 577-81. Epub 2014 Nov. 28. doi: 10.1038/nature13988. PubMed PMID: 25428507; PMCID: PMC4279952.
40. Le D T, Durham J N, Smith K N, Wang H, Bartlett B R, Aulakh L K, Lu S, Kemberling H, Wilt C, Luber B S, Wong F, Azad N S, Rucki A A, Laheru D, Donehower R, Zaheer A, Fisher G A, Crocenzi T S, Lee J J, Greten T F, Duffy A G, Ciombor K K, Eyring A D, Lam B H, Joe A, Kang S P, Holdhoff M, Danilova L, Cope L, Meyer C, Zhou S, Goldberg R M, Armstrong D K, Bever K M, Fader A N, Taube J, Housseau F, Spetzler D, Xiao N, Pardoll D M, Papadopoulos N, Kinzler K W, Eshleman J R, Vogelstein B, Anders R A, Diaz L A, Jr. Mismatch repair deficiency predicts response of solid tumors to PD-1 blockade. Science. 2017; 357 (6349): 409-13. Epub 2017 Jun. 10. doi: 10.1126/science.aan6733. PubMed PMID: 28596308; PMCID: PMC5576142.
41. Germano G, Lamba S, Rospo G, Barault L, Magri A, Maione F, Russo M, Crisafulli G, Bartolini A, Lerda G, Siravegna G, Mussolin B, Frapolli R, Montone M, Morano F, de Braud F, Amirouchene-Angelozzi N, Marsoni S, D'Incalci M, Orlandi A, Giraudo E, Sartore-Bianchi A, Siena S, Pietrantonio F, Di Nicolantonio F, Bardelli A. Inactivation of DNA repair triggers neoantigen generation and impairs tumour growth. Nature. 2017; 552 (7683): 116-20. Epub 2017 Dec. 1. doi: 10.1038/nature24673. PubMed PMID: 29186113.
42. Administration USFD. FDA grants accelerated approval to pembrolizumab for first tissue/site agnostic indication. www (dot) fdagov/drugs/informationondrugs/approveddrugs/ucm560040 (dot) 2017.
43. Guikema J E, Linehan E K, Tsuchimoto D, Nakabeppu Y, Strauss P R, Stavnezer J, Schrader C E. APE1- and APE2-dependent DNA breaks in immunoglobulin class switch recombination. The Journal of experimental medicine. 2007; 204 (12): 3017-26. doi: 10.1084/jem.20071289. PubMed PMID: 18025127; PMCID: 2118529.

44. Stavnezer J, Linehan E K, Thompson M R, Habboub G, Ucher A J, Kadungure T, Tsuchimoto D, Nakabeppu Y, Schrader C E. Differential expression of APE1 and APE2 in germinal centers promotes error-prone repair and A: T mutations during somatic hypermutation. Proc Natl Acad Sci USA. 2014; 111 (25): 9217-22. Epub 2014 Jun. 14. doi: 10.1073/pnas.1405590111. PubMed PMID: 24927551; PMCID: PMC4078814.
45. Xu J, Husain A, Hu W, Honjo T, Kobayashi M. APE1 is dispensable for S-region cleavage but required for its repair in class switch recombination. Proc Natl Acad Sci USA. 2014; 111 (48): 17242-7. Epub 2014 Nov. 19. doi: 10.1073/pnas.1420221111. PubMed PMID: 25404348; PMCID: PMC4260585.
46. Visnes T, Cazares-Korner A, Hao W, Wallner O, Masuyer G, Loseva O, Mortusewicz O, Wiita E, Sarno A, Manoilov A, Astorga-Wells J, Jemth A S, Pan L, Sanjiv K, Karsten S, Gokturk C, Grube M, Homan E J, Hanna BMF, Paulin CBJ, Pham T, Rasti A, Berglund U W, von Nicolai C, Benitez-Buelga C, Koolmeister T, Ivanic D, Iliev P, Scobie M, Krokan H E, Baranczewski P, Artursson P, Altun M, Jensen A J, Kalderen C, Ba X, Zubarev R A, Stenmark P, Boldogh I, Helleday T. Small-molecule inhibitor of OGG1 suppresses proinflammatory gene expression and inflammation. Science. 2018; 362 (6416): 834-9. Epub 2018 Nov. 18. doi: 10.1126/science.aar8048. PubMed PMID: 30442810.
47. Vlahopoulos S, Adamaki M, Khoury N, Zoumpourlis V, Boldogh I. Roles of DNA repair enzyme OGG1 in innate immunity and its significance for lung cancer. Pharmacol Ther. 2018. Epub 2018 Sep. 22. doi: 10.1016/j.pharmthera.2018.09.004. PubMed PMID: 30240635.
48. Imielinski M, Berger A H, Hammerman P S, Hernandez B, Pugh T J, Hodis E, Cho J, Suh J, Capelletti M, Sivachenko A, Sougnez C, Auclair D, Lawrence M S, Stojanov P, Cibulskis K, Choi K, de Waal L, Sharifnia T, Brooks A, Greulich H, Banerji S, Zander T, Seidel D, Leenders F, Ansen S, Ludwig C, Engel-Riedel W, Stoelben E, Wolf J, Goparju C, Thompson K, Winckler W, Kwiatkowski D, Johnson B E, Janne P A, Miller V A, Pao W, Travis W D, Pass H I, Gabriel S B, Lander E S, Thomas R K, Garraway L A, Getz G, Meyerson M. Mapping the hallmarks of lung adenocarcinoma with massively parallel sequencing. Cell. 2012; 150 (6): 1107-20. Epub 2012 Sep. 18. doi: 10.1016/j.cell.2012.08.029. PubMed PMID: 22980975; PMCID: 3557932.
49. Govindan R, Ding L, Griffith M, Subramanian J, Dees N D, Kanchi K L, Maher C A, Fulton R, Fulton L, Wallis J, Chen K, Walker J, McDonald S, Bose R, Ornitz D, Xiong D, You M, Dooling D J, Watson M, Mardis E R, Wilson R K. Genomic landscape of non-small cell lung cancer in smokers and never-smokers. Cell. 2012; 150 (6): 1121-34. doi: 10.1016/j.cell.2012.08.024. PubMed PMID: 22980976; PMCID: PMC3656590.
50. Leitner-Dagan Y, Sevilya Z, Pinchev M, Kremer R, Elinger D, Rennert H S, Schechtman E, Freedman L, Rennert G, Livneh Z, Paz-Elizur T. Enzymatic MPG DNA repair assays for two different oxidative DNA lesions reveal associations with increased lung cancer risk. Carcinogenesis. 2014; 35 (12): 2763-70. doi: 10.1093/carcin/bgu214. PubMed PMID: 25355292; PMCID: 4303808.
51. Sevilya Z, Leitner-Dagan Y, Pinchev M, Kremer R, Elinger D, Rennert H S, Schechtman E, Freedman L, Rennert G, Paz-Elizur T, Livneh Z. Low integrated DNA repair score and lung cancer risk. Cancer Prev Res. 2014; 7:398-406.
52. Sevilya Z, Leitner-Dagan Y, Pinchev M, Kremer R, Elinger D, Lejbkowicz F, Rennert H S, Freedman L S, Rennert G, Paz-Elizur T, Livneh Z. Development of APE1 enzymatic DNA repair assays: low APE1 activity is associated with increase lung cancer risk. Carcinogenesis. 2015; 36 (9): 982-91. doi: 10.1093/carcin/bgv082. PubMed PMID: 26045303; PMCID: PMC4552243.
53. Leitner-Dagan Y, Sevilya Z, Pinchev M, Kramer R, Elinger D, Roisman L C, Rennert H S, Schechtman E, Freedman L, Rennert G, Livneh Z, Paz-Elizur T. N-Methylpurine DNA Glycosylase and OGG1 DNA Repair Activities: Opposite Associations With Lung Cancer Risk. J Natl Cancer Inst. 2012; 104 (22): 1765-9. Epub 2012 Oct. 30. doi: 10.1093/jnci/djs445. PubMed PMID: 23104324; PMCID: 3502197.
54. Cassidy A, Myles J P, van Tongeren M, Page R D, Liloglou T, Duffy S W, Field J K. The LLP risk model: an individual risk prediction model for lung cancer. Br J Cancer. 2008; 98 (2): 270-6. doi: 10.1038/sj.bjc.6604158; PMCID: PMC2361453.

What is claimed is:

1. A method of treating a subject having cancer, the method comprising:
   (a) determining a level of catalytic activity of the DNA repair enzymes N-methylpurine DNA glycosylase (MPG), apurinic/apyrimidinic endonuclease 1 (APE1), 8-oxoguanine DNA glycosylase 1 (OGG1) in a biological sample of the subject; and
   (b) [i] administering to a subject having a statistically significant different level of catalytic activity of said DNA repair enzymes as compared to the catalytic activity of said DNA repair enzyme in a biological sample of a healthy subject, a therapeutically effective amount of an immune checkpoint regulator; or
   [ii] administering to a subject having a non-statistically significant different level of catalytic activity of said DNA repair enzymes as compared to the catalytic activity of said DNA repair enzyme in a biological sample of a healthy subject, a therapeutically effective amount of an anti-cancer agent other than said immune checkpoint regulator, thereby treating the cancer;

wherein determining said MPG catalytic activity is effected using a double stranded oligonucleotide substrate having a hypoxanthine lesion (Hx), wherein determining said MPG catalytic activity is effected using an oligonucleotide substrate having an N6-ethenoadenine lesion (eA), wherein determining said APE1 catalytic activity is effected using an oligonucleotide substrate having a furanyl abasic site lesion (AP) or wherein determining said OGG1 catalytic activity is effected using an oligonucleotide substrate having an 8-oxoguanine lesion.

2. The method of claim 1, further comprising receiving an identification that the subject has a statistically significant different level of catalytic activity of said DNA repair enzymes as compared to the catalytic activity of said DNA repair enzyme in a biological sample of a healthy subject following step (a) and prior to step (b).

3. The method of claim 1, wherein said DNA repair enzymes further comprises at least one DNA repair enzyme selected from the group consisting of NEIL1, SMUG1 and TDG.

4. The method of claim 1, wherein when a level of catalytic activity of said MPG is above a first predetermined value, when a level of catalytic activity of APE1 is below a second predetermined level and when a level of catalytic activity of OGG1 is below a third predetermined level, the subject is administered with said checkpoint regulator.

5. The method of claim 4, further comprising determining an integrated DNA repair score for said subject from said level of MPG, OGG1 and APE1 following step (a) and prior to step (b), wherein said subject that is administered with an immune checkpoint regulator has an integrated DNA repair score below a predetermined level, and said subject that is administered with an anti-cancer agent other than said immune checkpoint regulator has an integrated DNA repair score above a predetermined level.

6. The method of claim 2, wherein said identification comprises an integrated DNA repair score based on said level of MPG, OGG1 and APE1.

7. The method of claim 1, wherein said cancer is selected from the group consisting of lung cancer, head and neck cancer, breast cancer, bladder cancer, glioblastoma, osteosarcoma, pancreatic cancer, ovarian cancer and cervical cancer.

8. The method of claim 7, wherein said cancer is lung cancer.

9. The method of claim 8, wherein said lung cancer is non-small cell lung cancer.

10. The method of claim 1, wherein said biological sample is selected from the group consisting of a blood sample, a scraped cell sample and a biopsy.

11. The method of claim 1, wherein said biological sample comprises blood cells.

12. The method of claim 11, wherein said blood cells comprise isolated peripheral blood mononuclear cells.

13. The method of claim 11, wherein said blood cells comprise T cells.

14. The method of claim 13, wherein said T cells comprise ex vivo expanded T cells.

15. The method of claim 1, wherein said substrate comprises an oligonucleotide sequence as set forth in SEQ ID NO: 1 or SEQ ID NO: 7 annealed to an oligonucleotide sequence as set forth in SEQ ID NO: 2.

16. The method of claim 1, wherein said substrate comprises an oligonucleotide sequence as set forth in SEQ ID NO: 3 annealed to an oligonucleotide sequence as set forth in SEQ ID NO: 4.

17. The method of claim 1, wherein said substrate comprises an oligonucleotide sequence as set forth in SEQ ID NO: 8 or SEQ ID NO: 10 annealed to an oligonucleotide sequence as set forth in SEQ ID NO: 9.

18. The method of claim 1, wherein said substrate comprises an oligonucleotide sequence as set forth in SEQ ID NO: 5 annealed to an oligonucleotide sequence as set forth in SEQ ID NO: 6.

19. The method of claim 1, wherein determining said SMUG1 catalytic activity is effected using an oligonucleotide having a 5'-hydroxymethyluracil lesion.

20. The method of claim 1, wherein determining said TDG catalytic activity is effected using an oligonucleotide having a 5-carboxylcytosine (caC) lesion or a 5-formylcytosine (5fC) lesion.

21. The method of claim 1, wherein determining said NEIL1 catalytic activity is effected using an oligonucleotide having a spiroiminohydantoin (Sp) lesion.

22. The method of claim 1, wherein said immune checkpoint regulator comprises a checkpoint inhibitor.

* * * * *

SEQUENCE LISTING

```
<160> NUMBER OF SEQ ID NOS: 20

<210> SEQ ID NO 1
<211> LENGTH: 34
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<222> LOCATION: (20)..(20)
<223> OTHER INFORMATION: Hypoxanthine

<400> SEQUENCE: 1
gtccggtgca tgacactgtn acctatcctc agcg                               34

<210> SEQ ID NO 2
<211> LENGTH: 34
<212> TYPE: DNA
<213> ORGANISM: Artificial sequence
<220> FEATURE:
```

```
<223> OTHER INFORMATION: A single strand DNA oligonucleotide

<400> SEQUENCE: 2
cgctgaggat aggttacagt gtcatgcacc ggac                              34

<210> SEQ ID NO 3
<211> LENGTH: 32
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<222> LOCATION: (16)..(16)
<223> OTHER INFORMATION: N6-ethenoadenine (eA)

<400> SEQUENCE: 3
cctacctagc gacctncgac tgtcccactg ct                                32

<210> SEQ ID NO 4
<211> LENGTH: 32
<212> TYPE: DNA
<213> ORGANISM: Artificial sequence
<220> FEATURE:
<223> OTHER INFORMATION: A single strand DNA oligonucleotide

<400> SEQUENCE: 4
agcagtggga cagtcgtagg tcgctaggta gg                                32

<210> SEQ ID NO 5
<211> LENGTH: 32
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<223> OTHER INFORMATION: 3' Yakima yellow fluorescent tag conjugated
      oligonucleotide
<220> FEATURE:
<221> NAME/KEY: misc_feature
<222> LOCATION: (18)..(18)
<223> OTHER INFORMATION: 8-oxoguanine

<400> SEQUENCE: 5
ccggtgcatg acactgtnac ctatcctcag cg                                32

<210> SEQ ID NO 6
<211> LENGTH: 32
<212> TYPE: DNA
<213> ORGANISM: Artificial sequence
<220> FEATURE:
<223> OTHER INFORMATION: A single strand DNA oligonucleotide

<400> SEQUENCE: 6
cgctgaggat aggtcacagt gtcatgcacc gg                                32

<210> SEQ ID NO 7
<211> LENGTH: 34
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<223> OTHER INFORMATION: 3' Yakima yellow fluorescent tag conjugated
      oligonucleotide
<220> FEATURE:
<221> NAME/KEY: misc_feature
```

```
<222> LOCATION: (20)..(20)
<223> OTHER INFORMATION: hypoxanthine

<400> SEQUENCE: 7
gtccggtgca tgacactgtn acctatcctc agcg                                34

<210> SEQ ID NO 8
<211> LENGTH: 30
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<222> LOCATION: (16)..(16)
<223> OTHER INFORMATION: Furanyl abasic site

<400> SEQUENCE: 8
ggtgcatgac actgtnacct atcctcagcg                                     30

<210> SEQ ID NO 9
<211> LENGTH: 30
<212> TYPE: DNA
<213> ORGANISM: Artificial sequence
<220> FEATURE:
<223> OTHER INFORMATION: A single strand DNA oligonucleotide

<400> SEQUENCE: 9
cgctgaggat aggtcacagt gtcatgcacc                                     30

<210> SEQ ID NO 10
<211> LENGTH: 30
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<223> OTHER INFORMATION: 3' Yakima yellow fluorescent tag conjugated
      oligonucleotide
<220> FEATURE:
<221> NAME/KEY: misc_feature
<222> LOCATION: (16)..(16)
<223> OTHER INFORMATION: Furanyl abasic site

<400> SEQUENCE: 10
ggtgcatgac actgtnacct atcctcagcg                                     30

<210> SEQ ID NO 11
<211> LENGTH: 32
<212> TYPE: DNA
<213> ORGANISM: Artificial sequence
<220> FEATURE:
<223> OTHER INFORMATION: A single strand DNA oligonucleotide
<220> FEATURE:
<221> NAME/KEY: misc_feature
<222> LOCATION: (18)..(18)
<223> OTHER INFORMATION: 8-oxoguanine

<400> SEQUENCE: 11
ccggtgcatg acactgtnac ctatcctcag cg                                  32

<210> SEQ ID NO 12
<211> LENGTH: 33
<212> TYPE: DNA
<213> ORGANISM: Artificial sequence
<220> FEATURE:
<223> OTHER INFORMATION: DNA oligonucleotide sequence
<220> FEATURE:
```

<221> NAME/KEY: misc_feature
<222> LOCATION: (16)..(16)
<223> OTHER INFORMATION: n is spiroidiminohydantoin (Sp)

<400> SEQUENCE: 12
ggtgcatgac actgtnacct atcctcagcg agc        33

<210> SEQ ID NO 13
<211> LENGTH: 33
<212> TYPE: DNA
<213> ORGANISM: Artificial sequence
<220> FEATURE:
<223> OTHER INFORMATION: DNA oligonucleotide sequence
<220> FEATURE:
<221> NAME/KEY: misc_feature
<222> LOCATION: (16)..(16)
<223> OTHER INFORMATION: n is spiroidiminohydantoin (Sp)
<220> FEATURE:
<221> NAME/KEY: misc_feature
<222> LOCATION: (33)..(33)
<223> OTHER INFORMATION: 3' Yakima yellow fluorescent tag conjugated
      oligonucleotide

<400> SEQUENCE: 13
ggtgcatgac actgtnacct atcctcagcg agc        33

<210> SEQ ID NO 14
<211> LENGTH: 33
<212> TYPE: DNA
<213> ORGANISM: Artificial sequence
<220> FEATURE:
<223> OTHER INFORMATION: DNA oligonucleotide sequence

<400> SEQUENCE: 14
ccacgtactg tgacactgga taggagtcgc tcg        33

<210> SEQ ID NO 15
<211> LENGTH: 31
<212> TYPE: DNA
<213> ORGANISM: Artificial sequence
<220> FEATURE:
<223> OTHER INFORMATION: DNA oligonucleotide sequence
<220> FEATURE:
<221> NAME/KEY: misc_feature
<222> LOCATION: (17)..(17)
<223> OTHER INFORMATION: n is 5-hydroxymethyuracil (HmU)

<400> SEQUENCE: 15
cggtgcatga caatcangga atcctcagc g        31

<210> SEQ ID NO 16
<211> LENGTH: 31
<212> TYPE: DNA
<213> ORGANISM: Artificial sequence
<220> FEATURE:
<223> OTHER INFORMATION: DNA oligonucleotide sequence
<220> FEATURE:
<221> NAME/KEY: misc_feature
<222> LOCATION: (17)..(17)
<223> OTHER INFORMATION: n is 5-hydroxymethyuracil (HmU)
<220> FEATURE:
<221> NAME/KEY: misc_feature
<222> LOCATION: (31)..(31)
<223> OTHER INFORMATION: 3' Yakima yellow fluorescent tag conjugated
      oligonucleotide

<400> SEQUENCE: 16
cggtgcatga caatcangga atcctcagc g        31

-continued

```
<210> SEQ ID NO 17
<211> LENGTH: 31
<212> TYPE: DNA
<213> ORGANISM: Artificial sequence
<220> FEATURE:
<223> OTHER INFORMATION: DNA oligonucleotide sequence

<400> SEQUENCE: 17
gccacgtact gttagtgcct ttaggagtcg c                              31

<210> SEQ ID NO 18
<211> LENGTH: 32
<212> TYPE: DNA
<213> ORGANISM: Artificial sequence
<220> FEATURE:
<223> OTHER INFORMATION: DNA oligonucleotide sequence
<220> FEATURE:
<221> NAME/KEY: misc_feature
<222> LOCATION: (12)..(12)
<223> OTHER INFORMATION: n is carboxylcytosine (caC)

<400> SEQUENCE: 18
catgacactc angtagctca gctaggacta cc                             32

<210> SEQ ID NO 19
<211> LENGTH: 32
<212> TYPE: DNA
<213> ORGANISM: Artificial sequence
<220> FEATURE:
<223> OTHER INFORMATION: DNA oligonucleotide sequence
<220> FEATURE:
<221> NAME/KEY: misc_feature
<222> LOCATION: (12)..(12)
<223> OTHER INFORMATION: n is carboxylcytosine (caC)
<220> FEATURE:
<221> NAME/KEY: misc_feature
<222> LOCATION: (32)..(32)
<223> OTHER INFORMATION: 3' Yakima yellow fluorescent tag conjugated
      oligonucleotide

<400> SEQUENCE: 19
catgacactc angtagctca gctaggacta cc                             32

<210> SEQ ID NO 20
<211> LENGTH: 32
<212> TYPE: DNA
<213> ORGANISM: Artificial sequence
<220> FEATURE:
<223> OTHER INFORMATION: DNA oligonucleotide sequence

<400> SEQUENCE: 20
gtactgtgag tgcatcgagt cgatcctgat gg                             32
```